(12) United States Patent
Kubota

(10) Patent No.: US 11,897,266 B2
(45) Date of Patent: Feb. 13, 2024

(54) MEMORY, LIQUID STORAGE CONTAINER, AND PRINTING SYSTEM

(71) Applicant: SEIKO EPSON CORPORATION, Tokyo (JP)

(72) Inventor: Tomoo Kubota, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/689,087

(22) Filed: Mar. 8, 2022

(65) Prior Publication Data

US 2022/0288941 A1    Sep. 15, 2022

(30) Foreign Application Priority Data

Mar. 9, 2021  (JP) ................................ 2021-037085
Jun. 29, 2021 (JP) ................................ 2021-107567

(51) Int. Cl.
*B41J 2/175*     (2006.01)
*G06F 3/12*      (2006.01)

(52) U.S. Cl.
CPC ....... *B41J 2/17546* (2013.01); *B41J 2/17566* (2013.01); *G06F 3/1235* (2013.01); *B41J 2002/17589* (2013.01)

(58) Field of Classification Search
CPC ............... B41J 2/17546; B41J 2/17566; B41J 2002/17589
See application file for complete search history.

(56) References Cited

U.S. PATENT DOCUMENTS

| 6,412,894 B1* | 7/2002 | Askren | B41J 2/17509 |
| | | | 347/7 |
| 2005/0185035 A1* | 8/2005 | Takei | B41J 2/17546 |
| | | | 347/86 |
| 2020/0338900 A1* | 10/2020 | Morikawa | B41J 2/17513 |

FOREIGN PATENT DOCUMENTS

JP    2016-163983 A    9/2016

* cited by examiner

*Primary Examiner* — Jason S Uhlenhake
(74) *Attorney, Agent, or Firm* — Oliff PLC

(57) ABSTRACT

Memory provided in an ink cartridge attached to a printing apparatus includes: a storage section in which ink amount information about an amount of stored ink and threshold information about a threshold of the amount of the ink are stored; and a processing section that performs processing based on information received from the printing apparatus and information stored in the storage section, in which when receiving, from the printing apparatus, empty-ink information indicating that the ink cartridge is in an unusable state, the processing section performs comparing processing of comparing the ink amount information with the threshold information, when a result of the comparing processing satisfies a predetermined writing condition, the processing section writes the empty-ink information to the storage section, and when the result does not satisfy the writing condition, the processing section does not write the empty-ink information to the storage section.

14 Claims, 22 Drawing Sheets

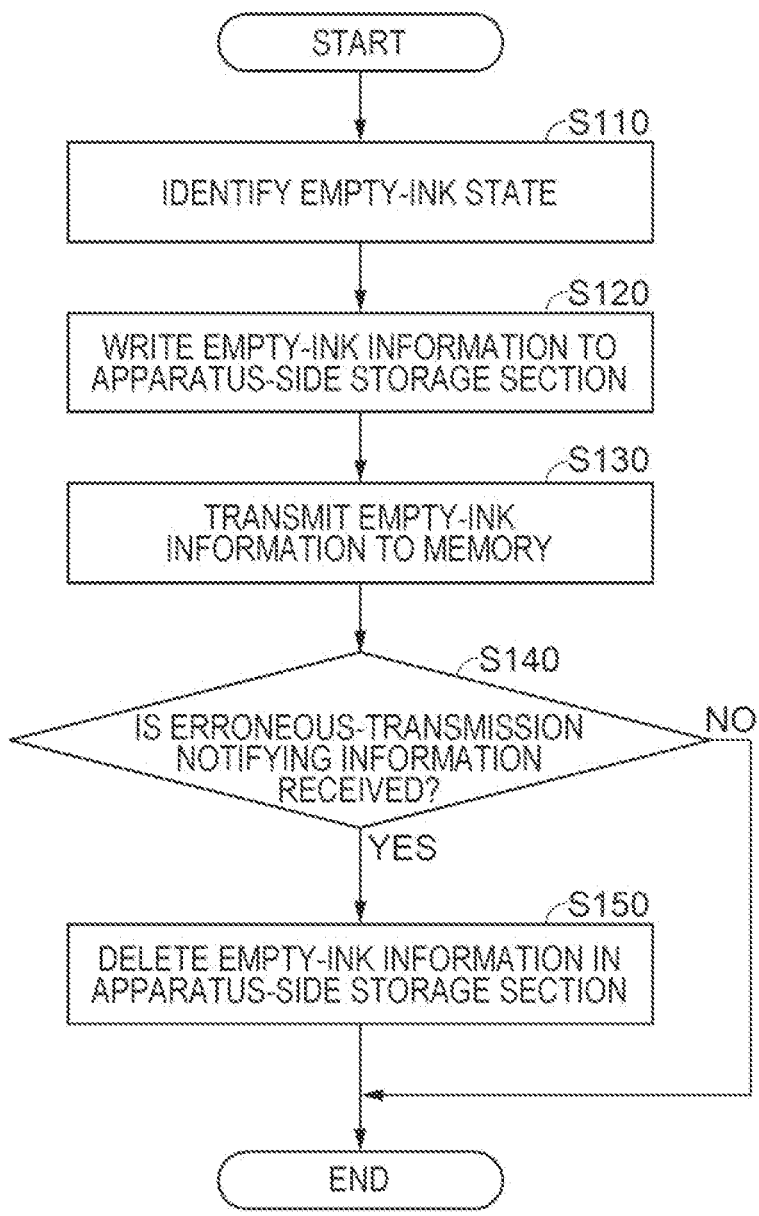

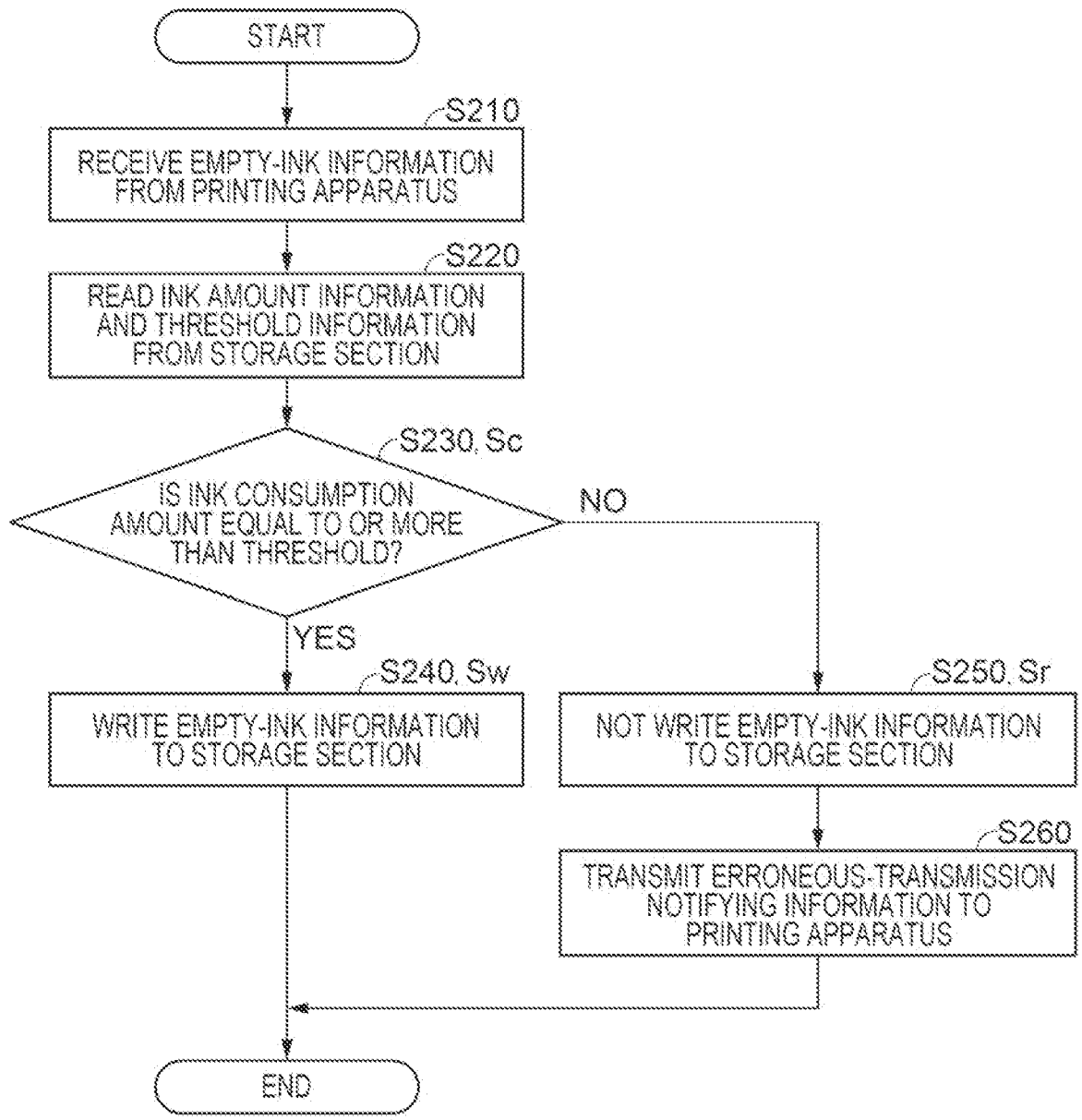

MEMORY, LIQUID STORAGE CONTAINER, AND PRINTING SYSTEM

The present application is based on, and claims priority from JP Application Serial Number 2021-037085, filed Mar. 9, 2021 and JP Application Serial Number 2021-107567, filed Jun. 29, 2021, the disclosures of which are hereby incorporated by reference herein in their entirety.

BACKGROUND

1. Technical Field

The present disclosure relates to memory, a liquid storage container including the memory, and a printing system.

2. Related Art

Regarding a printing system including a liquid storage container, such as an ink cartridge, and including a printing apparatus, a technique in which an empty-ink sensor provided in the printing apparatus detects an empty-ink state of the liquid storage container and in which the printing apparatus writes the empty-ink state to memory provided in the liquid storage container is known.

For example, JP-A-2016-163983 discloses a printing apparatus in which ink is fed from an ink pack having a storage element. In the printing apparatus, in an instance in which an empty-ink sensor detects a liquid-feeding disabled state in which no ink is fed from the ink pack to a temporary-storage tank, when a predetermined writing condition is satisfied, the printing apparatus writes the empty-ink state to the storage element of the ink pack. The predetermined writing condition is, for example, a condition in which a temporary empty-ink state has been written to the storage element. When the writing condition is satisfied, the empty-ink state is written to the storage element, and feeding of the ink is stopped to prevent blank printing.

However, according to JP-A-2016-163983, due to a firmware failure, an empty-ink sensor failure, or the like on the printing apparatus side, the printing apparatus may undesirably write the temporary empty-ink state or the empty-ink state to the storage element of the ink pack even though the liquid-feeding disabled state is not detected by the empty-ink sensor. Thus, a problem may occur such that, even though the ink pack still contains ink, the printing apparatus determines the state as the empty-ink state and that the ink pack is unusable. Such a problem may occur when a printing apparatus including a waste-ink tank, in which ink ejected during head cleaning is collected, writes a full-ink state to a storage element of the waste-ink tank.

SUMMARY

Memory is provided in a liquid storage container attached to a printing apparatus, and the memory includes: a storage section in which ink amount information about an amount of ink stored in the liquid storage container and threshold information about a threshold of the amount of the ink are stored; and a processing section that performs processing based on information received from the printing apparatus and information stored in the storage section, in which when receiving, from the printing apparatus, detection information indicating that the liquid storage container is in an unusable state, the processing section performs comparing processing of comparing the ink amount information with the threshold information, when a result of the comparing processing satisfies a predetermined writing condition, the processing section writes the detection information to the storage section, and when the result of the comparing processing does not satisfy the writing condition, the processing section does not write the detection information to the storage section.

A liquid storage container is attached to the printing apparatus and includes the memory.

A printing system includes: a printing apparatus; and a liquid storage container attached to the printing apparatus and including memory, in which the memory includes a storage section in which ink amount information about an amount of ink stored in the liquid storage container and threshold information about a threshold of the amount of the ink are stored and a processing section that performs processing based on information received from the printing apparatus and information stored in the storage section, the printing apparatus transmits, to the memory, detection information indicating that the liquid storage container is in an unusable state, when receiving the detection information from the printing apparatus, the processing section performs comparing processing of comparing the ink amount information with the threshold information, when a result of the comparing processing satisfies a predetermined writing condition, the processing section writes the detection information to the storage section, and when the result of the comparing processing does not satisfy the writing condition, the processing section does not write the detection information to the storage section.

BRIEF DESCRIPTION OF THE DRAWINGS

FIG. 7A is a flowchart of processing of a printing apparatus.

FIG. 7B is a flowchart of processing of memory.

DESCRIPTION OF EXEMPLARY EMBODIMENTS

1. First Embodiment

Figure 1:
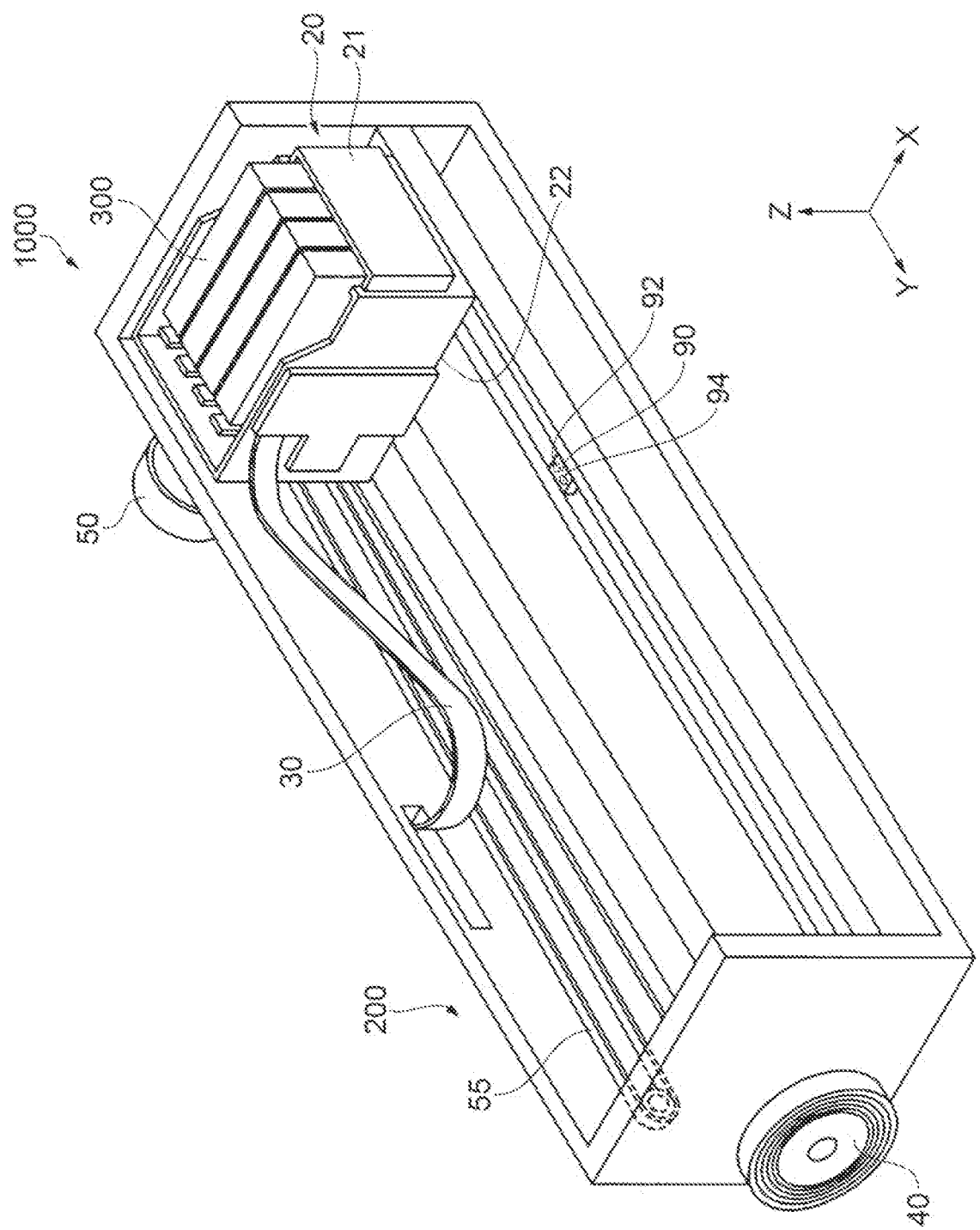
FIG. 1 is a perspective view illustrating a hardware configuration of a printing system.
Figure 2:
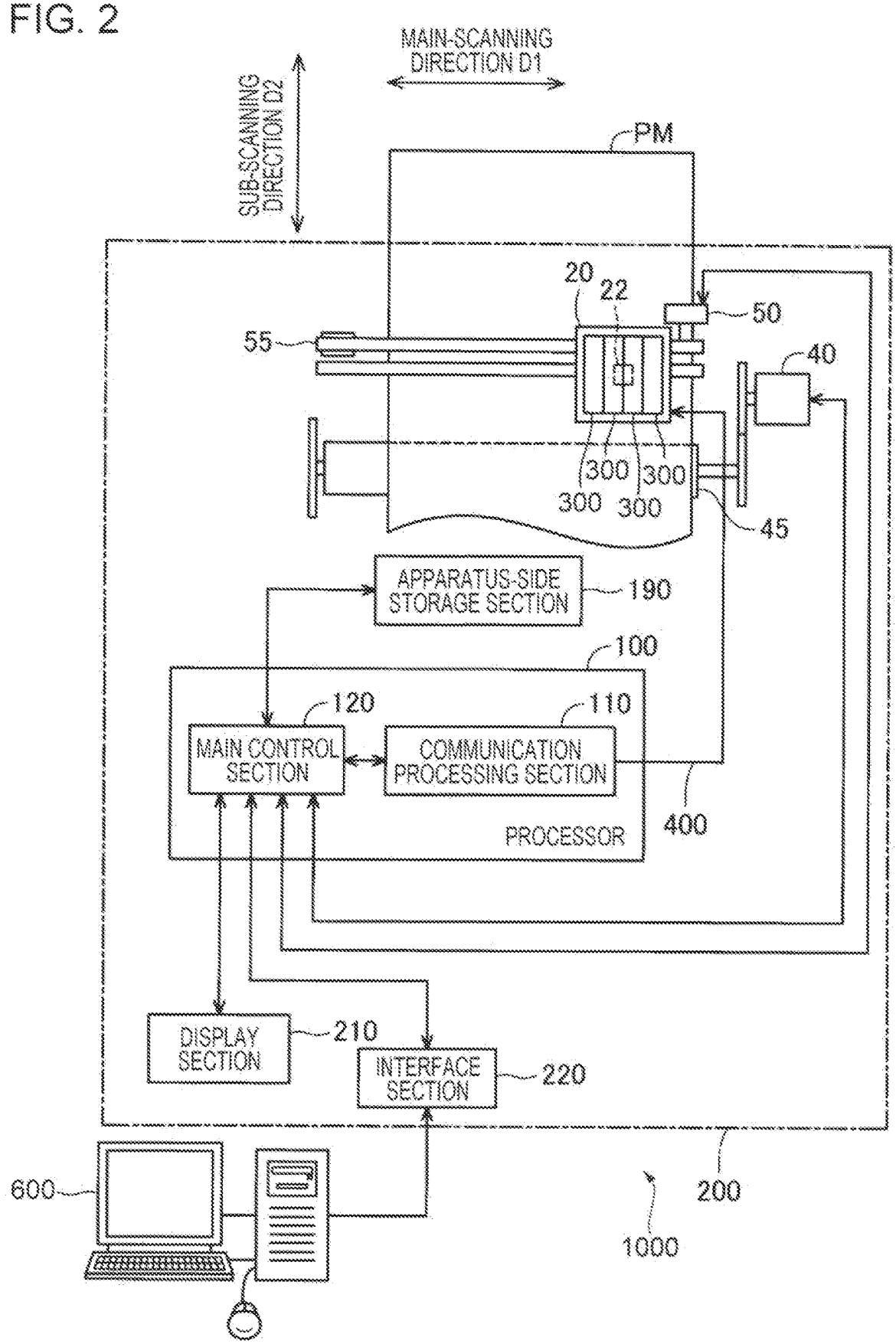
FIG. 2 is a block diagram illustrating a functional section of the printing system.

FIG. 1 is a perspective view illustrating a hardware configuration of a printing system 1000 in a first embodiment. FIG. 2 is a block diagram illustrating a functional section of the printing system 1000. The X direction, the Y direction, and the Z direction that are orthogonal to each other are indicated in FIG. 1. The forward direction of the printing system 1000 in the posture in normal use is the X direction, and the vertically up direction thereof is the Z direction. In the present embodiment, the coordinate system determined by the X direction, the Y direction, and the Z direction is a left-handed system. The direction opposite to the X direction is the −X direction. The direction opposite to the Y direction is the −Y direction. The direction opposite to the Z direction is the −Z direction.

The printing system 1000 includes a printing apparatus 200 and an ink cartridge 300 as a liquid storage container. The ink cartridge 300 is detachably mounted on the printing apparatus 200. Specifically, the printing apparatus 200 is an ink jet printer. The printing apparatus 200 includes a carriage 20, a cable 30, a paper feeding motor 40, a paper feeding roller 45, a carriage motor 50, a carriage driving belt 55, a detecting element 90, and a processor 100.

Four ink cartridges 300 are mounted on the carriage 20, and the carriage 20 transports the ink cartridges 300 in the Y direction and the −Y direction. The carriage 20 includes a holder 21 and a printing head 22. The holder 21 is configured such that four ink cartridges 300 are attachable thereto and detachable therefrom. Note that the number of ink cartridges 300 is not limited to four.

The printing head 22 is provided on the −Z direction surface of the carriage 20. A plurality of nozzles for ejecting ink droplets are provided on the surface of the printing head 22, which faces the −Z direction. The respective nozzles are coupled to the ink cartridge 300 via a channel in the carriage 20. The ink is supplied from the ink cartridge 300 to the printing head 22 via the channel in the carriage 20, and the printing head 22 ejects the ink from the nozzles in the −Z direction. The ink ejected from the nozzles of the printing head 22 is deposited on a printing medium PM and forms an image. In the present specification, an image includes characters and symbols.

The cable 30 is used to couple the carriage 20 and the processor 100. The printing head 22 of the carriage 20 is controlled by the processor 100 via the cable 30. Memory 352 (refer to FIG. 3) described later, which is included in the ink cartridge 300, is controlled by the processor 100 via the cable 30. The printing apparatus 200 includes a bus 400 for performing communication with the memory 352 of the ink cartridge 300 attached to the printing apparatus 200. A portion of a path of the bus 400 is constituted by the cable 30. The bus 400 includes a signal line for transmitting a clock signal, a signal line for transmitting and receiving a data signal, and the like.

The carriage driving belt 55 is an endless belt. The carriage 20 is fixed to the carriage driving belt 55. The carriage driving belt 55 rotates in the forward direction and the reverse direction to thereby move the carriage 20 in the Y direction and the −Y direction. The carriage motor 50 enables the carriage driving belt 55 to rotate in the forward direction and the reverse direction.

The paper feeding motor 40 enables the paper feeding roller 45 to rotate. When the paper feeding motor 40 rotates, the paper feeding roller 45 transports the printing medium PM in the X direction.

The detecting element 90 detects a remaining state of the ink stored in the ink cartridge 300. The detecting element 90 includes a light-emitting element 92 and a light-receiving element 94, which are provided side by side in the Y direction and the −Y direction in which the carriage 20 moves.

When the printing medium PM is transported by the paper feeding roller 45 in the X direction and when the printing head 22 provided in the carriage 20 is moved by the carriage driving belt 55 in the Y direction and the −Y direction, the ink ejected from the printing head 22 in the −Z direction is deposited on a portion of the printing medium PM. When the paper feeding motor 40, the carriage motor 50, and the printing head 22 are controlled by the processor 100 in accordance with printing data, an image is formed on the printing medium PM. In the present specification, the Y direction and the −Y direction in which the carriage 20 moves are collectively called a main-scanning direction D1. The X direction and the −X direction in which the printing medium PM is fed are collectively called a sub-scanning direction D2.

FIG. 2 illustrates the printing head 22, which is not illustrated in FIG. 1, the paper feeding roller 45, and the processor 100. The printing apparatus 200 further includes an apparatus-side storage section 190, a display section 210, and an interface section 220.

The processor 100 is a central processing unit (CPU). The apparatus-side storage section 190 is semiconductor memory. The concept of the apparatus-side storage section 190 includes random access memory (RAM) and read-only memory (ROM). In the printing apparatus 200, the processor 100 and the apparatus-side storage section 190, which are hardware resources, and a control program cooperate with each other. Specifically, when the processor 100, which is a CPU, loads a computer program stored in the ROM into the RAM and executes the computer program, various functions are realized.

The display section 210 displays various kinds of information in accordance with control performed by the processor 100. Specifically, the display section 210 is a liquid crystal panel. The interface section 220 transmits information processed by the processor 100 to the outside, receives information from the outside, and provides the processor 100 with the information. Specifically, the interface section 220 receives printing data from an external computer 600 and provides the processor 100 with the printing data. The interface section 220 transmits a signal created by the processor 100 to request the printing data to the external computer 600.

The processor 100 functions as a communication processing section 110 and a main control section 120. The communication processing section 110 performs communication processing with the memory 352 of the ink cartridge 300 via the bus 400. The main control section 120 controls the respective sections of the printing apparatus 200. The main control section 120 also controls the communication processing section 110. The processing performed by the communication processing section 110 and the main control section 120 will be described later.

Figure 3:
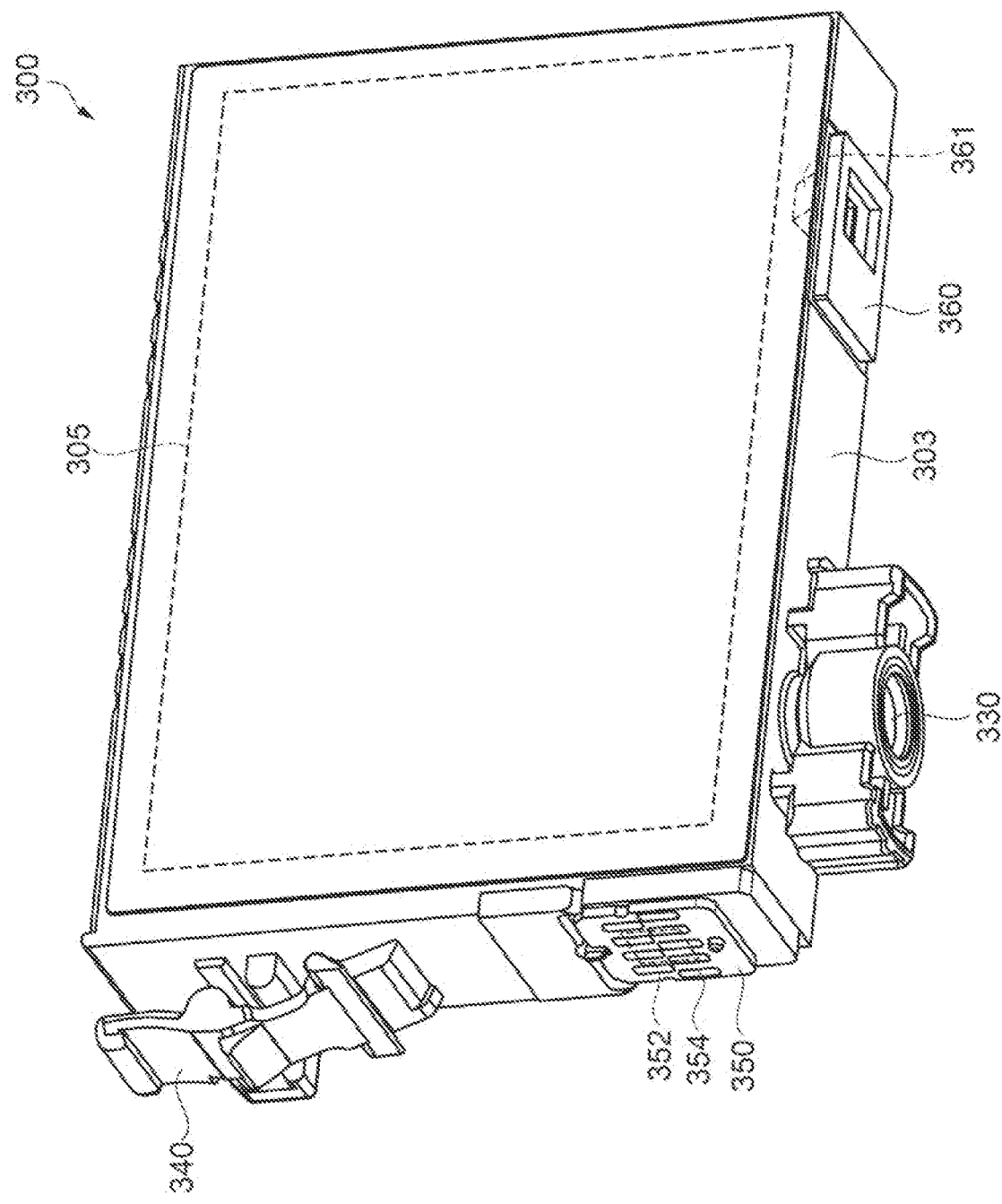
FIG. 3 is a perspective view illustrating an ink cartridge.

FIG. 3 is a perspective view illustrating the ink cartridge 300. The ink cartridge 300 is attached to the holder 21 of the printing apparatus 200 and supplies the ink to the printing head 22. The ink cartridge 300 includes a case 303, an ink storage section 305, an ink supplying port 330, a lever 340, a circuit substrate 350, and a prism unit 360.

The case 303 is a substantially rectangular parallelepiped housing that constitutes a main body of the ink cartridge 300. The case 303 stores the ink therein. The lever 340 is attached to a single surface of the substantially rectangular parallelepiped case 303. When the ink cartridge 300 is attached to the holder 21, the lever 340 enables the holder 21 to hold the case 303. When the ink cartridge 300 is detached from the holder 21, the lever 340 is operated to enable the holder 21 to release the case 303.

The ink storage section 305 is a space provided in the case 303. The ink storage section 305 stores the ink. The ink supplying port 330 is used to supply the ink stored in the ink storage section 305 to the printing apparatus 200. The ink supplying port 330 is sealed by a film (not illustrated). When the ink cartridge 300 is attached to the holder 21 of the printing apparatus 200, the film is removed.

The circuit substrate 350 is provided on the surface of the rectangular parallelepiped case 303, on which the lever 340 is provided. The circuit substrate 350 includes the memory 352 and nine terminals 354.

The nine terminals 354 are provided on the front surface of the circuit substrate 350. The respective terminals 354 are coupled to corresponding terminals provided in the holder 21 in a state in which the ink cartridge 300 is attached to the holder 21. As a result, the memory 352 is electrically coupled to the processor 100 of the printing apparatus 200 via the terminals 354, the corresponding terminals provided in the holder 21, and the cable 30. A portion of the path of the bus 400 for enabling the memory 352 of the ink cartridge 300 attached to the printing apparatus 200 to communicate with the printing apparatus 200 is constituted by the terminals 354 of the circuit substrate 350, the terminals of the holder 21, and the cable 30. Note that the number of terminals 354 is not limited to nine.

The memory 352 is provided on the rear surface of the circuit substrate 350. Information about the ink cartridge 300, which includes the memory 352, is stored in the memory 352.

The prism unit 360 includes a prism 361 that detects whether or not ink remains in the ink storage section 305. The prism unit 360 is a transparent member formed of a synthetic resin, such as polypropylene. The prism unit 360 is attached such that the prism 361 is located in the ink storage section 305.

Figure 4A:
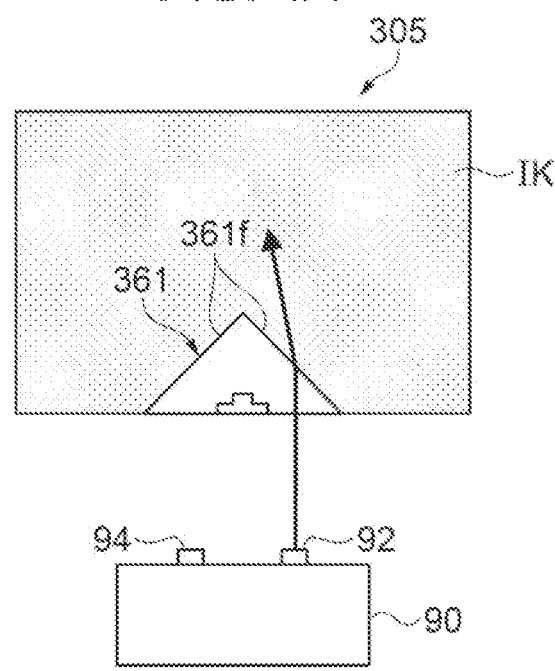
FIG. 4A is a view for explaining detection of a remaining state of ink by a prism.
Figure 4B:
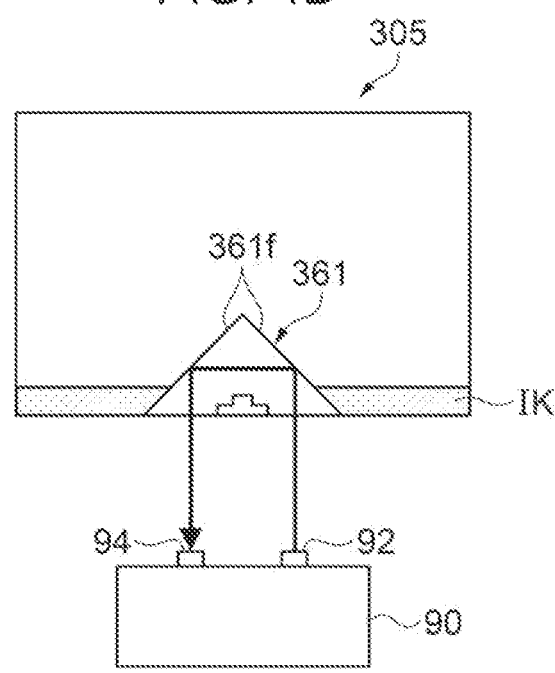
FIG. 4B is a view for explaining detection of the remaining state of ink by the prism.

FIGS. 4A and 4B are views for explaining detection of a remaining state of the ink by the prism 361. As illustrated in FIGS. 4A and 4B, when the carriage 20 on which the ink cartridge 300 is mounted passes above the detecting element 90 provided in the printing apparatus 200 in the main-scanning direction D1, light emitted from the light-emitting element 92 enters the prism 361. A state of light reflected by the prism 361 varies in accordance with a refractive index of fluid in contact with a reflecting surface 361f. In FIG. 4A, since ink IK remains in the ink storage section 305 so as to be in contact with the entire reflecting surface 361f, light emitted from the light-emitting element 92 passes through the reflecting surface 361f and is absorbed by the ink IK. On the other hand, in FIG. 4B, since the amount of the ink IK remaining in the ink storage section 305 is small and the reflecting surface 361f is in contact with air, the light emitted from the light-emitting element 92 is reflected by the reflecting surface 361f of the prism 361 and enters the light-receiving element 94. Accordingly, by measuring the light that has entered the light-receiving element 94, it is possible to detect a state in which the ink remaining amount is small.

Figure 5:
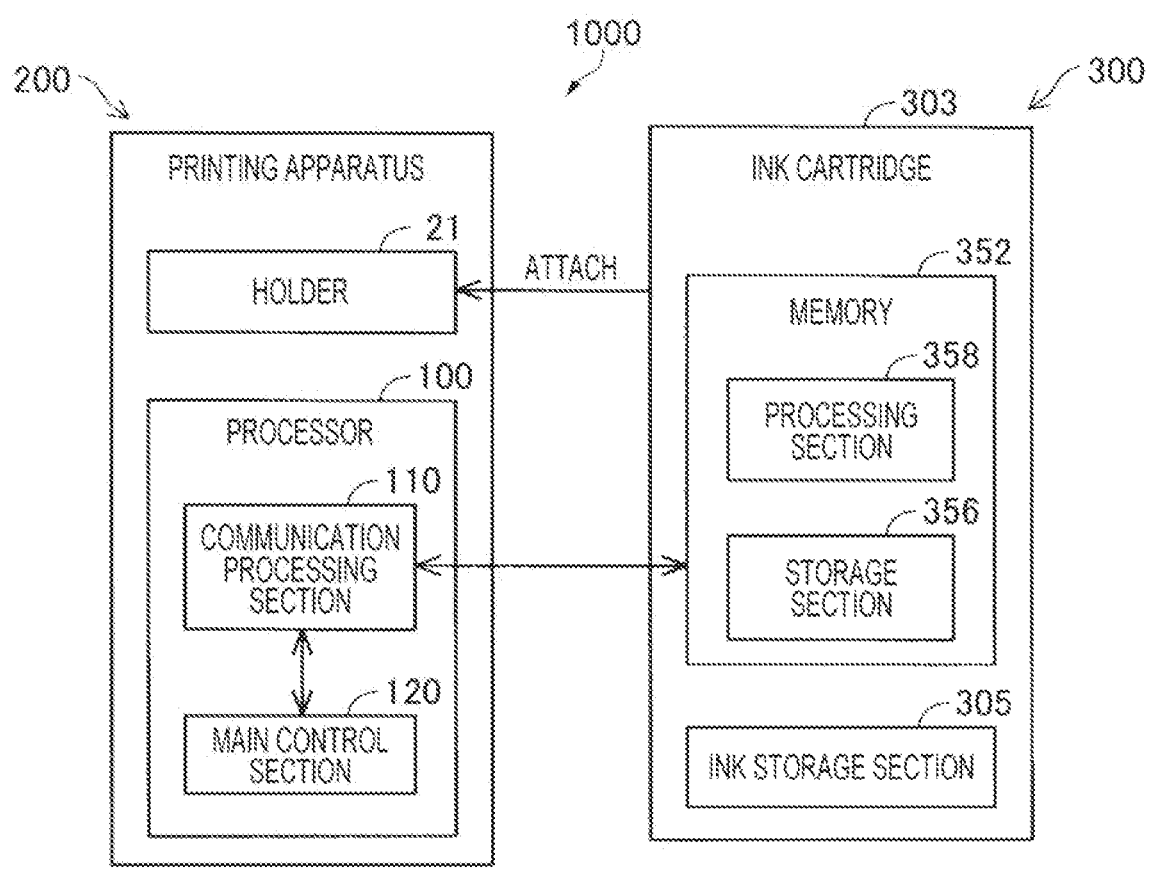
FIG. 5 is a block diagram illustrating a system configuration of the printing system.

FIG. 5 is a block diagram illustrating a system configuration of the printing system 1000. In FIG. 5, for ease of understanding the technique, some configurations of the printing apparatus 200 and some configurations of the ink cartridge 300 are illustrated.

The memory 352 of the ink cartridge 300 includes a storage section 356 and a processing section 358. The storage section 356 is non-volatile memory in which information is able to be retained even when no power is supplied. Specifically, the storage section 356 includes a hardware configuration in which word lines and bit lines are arrayed in a matrix. The processing section 358 is a CPU as the processor. The processing section 358 performs processing based on information received from the printing apparatus 200 and information stored in the storage section 356. Note that at least a portion of the processing section 358 may be configured as a hardware circuit.

Figure 6:
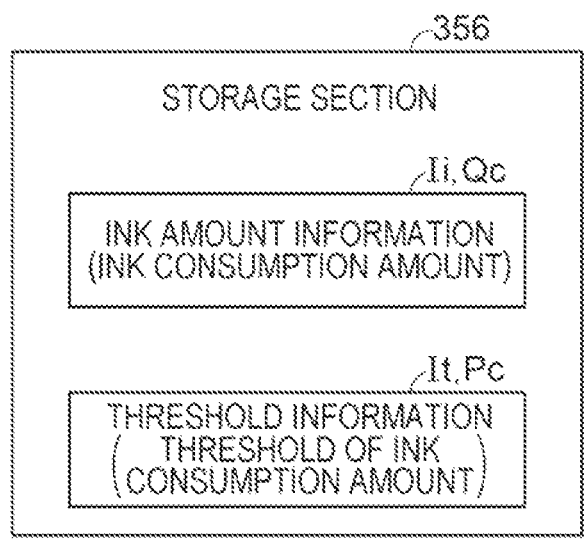
FIG. 6 is a block diagram illustrating information stored in a storage section.

FIG. 6 is a block diagram illustrating information stored in the storage section 356. Ink amount information Ii and threshold information It are stored in the storage section 356. The ink amount information Ii is information about the amount of the ink stored in the ink cartridge 300. In the present embodiment, the ink amount information Ii is information indicating an ink consumption amount Qc, which is the cumulative amount of the ink supplied from the ink cartridge 300 to the printing apparatus 200 and consumed by the printing apparatus 200. Each time the printing apparatus 200 performs printing, maintenance, or the like, the processing section 358 receives information about the amount of the ink consumed by the printing apparatus 200 from the printing apparatus 200 and updates the ink amount information Ii.

The threshold information It is information indicating a threshold of the amount of the ink. In the present embodiment, the threshold information It is information indicating a threshold Pc of the ink consumption amount Qc. Regarding the threshold information It, the threshold Pc is factory set as an initial value, and the processing section 358 uses the threshold information It to perform comparing processing Sc described later. Both the ink consumption amount Qc and the threshold Pc are expressed as a percentage (%), and 100% represents a state in which the ink consumption amount Qc is the same as the storage amount of the ink storage section 305. The threshold information It is set to, for example, 90%. Note that the ink consumption amount Qc and the threshold Pc may be expressed in units of mass (g).

Various kinds of information are also stored in the storage section 356 in addition to the ink amount information Ii and the threshold information It. Empty-ink information described later is also stored in the storage section 356.

FIG. 7A is a flowchart of processing of the printing apparatus 200. FIG. 7B is a flowchart of processing of the memory 352. A flowchart of the entire processing of the printing system 1000 is constituted by the flowcharts of FIGS. 7A and 7B.

First, the processing of the printing apparatus 200 will be described with reference to FIG. 7A. In step S110, the main control section 120 identifies that the ink cartridge 300 is in an empty-ink state. The empty-ink state refers to a state in which the ink in the ink storage section 305 of the ink cartridge 300 is depleted, such that the printing apparatus 200 is unable to perform printing or maintenance and the ink cartridge 300 is no longer usable. For example, as illustrated in FIGS. 4A and 4B, the empty-ink state is detected by the detecting element 90 of the printing apparatus 200. In the present embodiment, step S110 includes not only an instance in which the detecting element 90 actually detects the empty-ink state but also an instance in which the main control section 120 identifies the empty-ink state due to a firmware failure of the printing apparatus 200 or due to erroneous operation of the detecting element 90.

In step S120, the main control section 120 writes, to the apparatus-side storage section 190, empty-ink information as detection information indicating that the ink cartridge 300 is in the empty-ink state. For example, the main control section 120 sets an empty-ink flag in the apparatus-side storage section 190.

In step S130, the communication processing section 110 transmits the empty-ink information to the memory 352 via the bus 400.

Note that step S120 and step S130 may be performed at the same time, or step S120 may be performed after step S130 is performed.

Next, the processing of the memory 352 after step S130 in FIG. 7A will be described with reference to FIG. 7B. In step S210, the processing section 358 receives the empty-ink information from the printing apparatus 200. In step S220, the processing section 358 reads the ink amount information Ii and the threshold information It from the storage section 356. In step S230, the processing section 358 performs processing of comparing the ink amount information Ii with the threshold information It. Specifically, the processing section 358 performs processing of comparing the ink consumption amount Qc indicated by the ink amount information Ii with the threshold Pc indicated by the threshold information It. The processing performed in step S230 is referred to as comparing processing Sc.

In step S230, the processing section 358 determines whether or not the result of the comparing processing Sc satisfies a predetermined writing condition. The writing condition in the present embodiment is a condition in which the ink consumption amount Qc is equal to or more than the threshold Pc. When determining that the ink consumption amount Qc is equal to or more than the threshold Pc, the processing section 358 writes the empty-ink information to the storage section 356 in step S240. The processing performed in step S240 is referred to as writing processing Sw. On the other hand, when determining that the ink consumption amount Qc is less than the threshold Pc in step S230, the processing section 358 does not write the empty-ink information to the storage section 356 in step S250. The processing performed in step S250 is referred to as writing restriction processing Sr.

When step S250 is performed, the processing section 358 in step S260 transmits, to the printing apparatus 200, erroneous-transmission notifying information for notifying that the empty-ink information has been erroneously transmitted by the printing apparatus 200.

Next, the processing of the printing apparatus 200 after step S240 and step S260 in FIG. 7B will be described with reference to FIG. 7A. In step S140, the communication processing section 110 determines whether or not the erroneous-transmission notifying information is received from the memory 352. When the erroneous-transmission notifying information is received, the main control section 120 deletes the empty-ink information stored in the apparatus-side storage section 190 in step S150. Specifically, the empty-ink flag set in step S120 is cancelled. On the other hand, when the erroneous-transmission notifying information is not received, the main control section 120 ends the processing.

According to the present embodiment, when the processing section 358 determines that the ink consumption amount Qc is equal to or more than the threshold Pc in step S230, since the ink in the ink cartridge 300 is consumed by an amount equal to or more than the threshold Pc, there is a high probability that the empty-ink information received from the printing apparatus 200 has been transmitted normally by the printing apparatus 200. On the other hand, when the processing section 358 determines that the ink consumption amount Qc is less than the threshold Pc in step S230, since the ink in the ink cartridge 300 is not consumed by an amount equal to or more than the threshold Pc, the ink remains in the ink cartridge 300, and there is a high probability that the empty-ink information received from the printing apparatus 200 has been erroneously transmitted by the printing apparatus 200. Thus, the ink consumption amount Qc indicated by the ink amount information Ii is compared with the threshold Pc indicated by the threshold information It before the memory 352 writes the empty-ink information, and when the result thereof satisfies the writing condition described above, the memory 352 writes the empty-ink information to the storage section 356. When the result does not satisfy the writing condition, the memory 352 does not write the empty-ink information to the storage section 356. As a result, the memory 352 suppresses the empty-ink information from being written undesirably to the memory 352 due to a firmware failure, an empty-ink sensor failure, or the like of the printing apparatus 200. When the memory 352 determines that the ink consumption amount Qc is less than the threshold Pc, writing of the empty-ink information is restricted, thereby suppressing the ink cartridge 300 from being unusable due to erroneous recording of the empty-ink information.

2. Second Embodiment

The memory 352 in a second embodiment includes a storage section 356a instead of the storage section 356 in the first embodiment.

Figure 8:
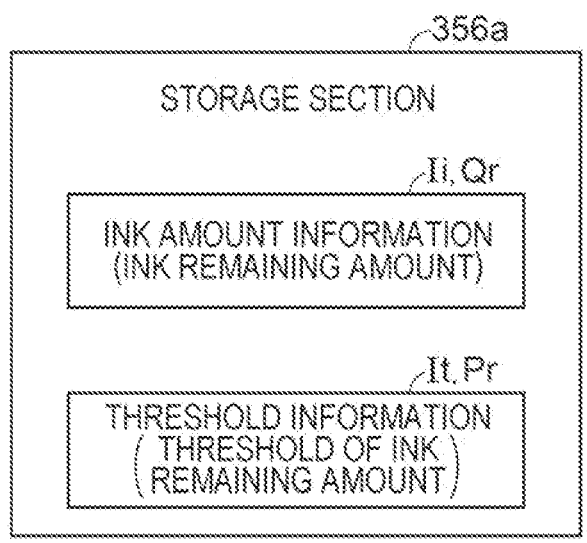
FIG. 8 is a block diagram illustrating information stored in a storage section in a second embodiment.

FIG. 8 is a block diagram illustrating information stored in the storage section 356a. Note that the same components as those of the first embodiment will be given the same numerals, and redundant description will be omitted.

In the second embodiment, information indicated by ink amount information Ii and threshold information It stored in the storage section 356a differs from that in the first embodiment. The ink amount information Ii is information indicating an ink remaining amount Qr, which corresponds to the amount of the ink remaining in the ink cartridge 300. The threshold information It is information indicating a threshold Pr of the ink remaining amount Qr. Both the ink remaining amount Qr and the threshold Pr are expressed as a percentage (%), and 100% represents a state in which the ink remaining amount Qr is the same as the storage amount of the ink storage section 305 that is factory set. The threshold information It is set to, for example, 10%. Note that the ink remaining amount Qr and the threshold Pr may be expressed in units of mass (g).

Figure 9:
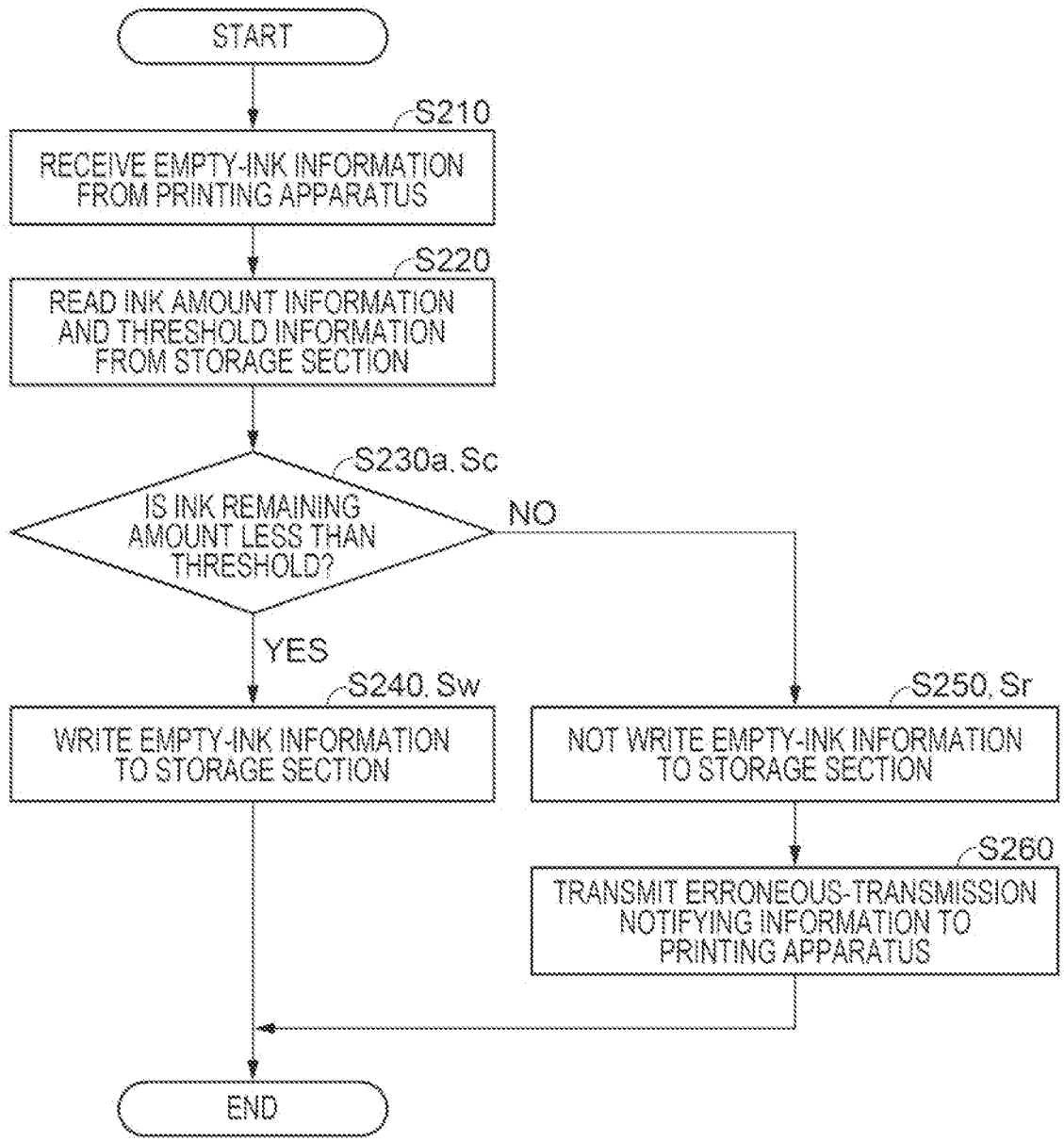
FIG. 9 is a flowchart of processing of memory in the second embodiment.

FIG. 9 is a flowchart of processing of the memory 352 in the second embodiment. Note that the processing of the printing apparatus 200 in the second embodiment is similar to that in the first embodiment, and description thereof will be omitted. The processing of the memory 352 in the second embodiment differs from that in the first embodiment in terms of step S230a. In step S230a, the processing section 358 performs processing of comparing the ink remaining amount Qr indicated by the ink amount information Ii with the threshold Pr indicated by the threshold information It. The processing performed in step S230a is also referred to as comparing processing Sc similarly to that in step S230 in the first embodiment.

In step S230a, the processing section 358 determines whether or not the result of the comparing processing Sc satisfies a predetermined writing condition. The writing condition in the present embodiment is a condition in which the ink remaining amount Qr is less than the threshold Pr. When determining that the ink remaining amount Qr is less than the threshold Pr, the processing section 358 writes the empty-ink information to the storage section 356a in step S240. On the other hand, when determining that the ink remaining amount Qr is equal to or more than the threshold Pr in step S230a, the processing section 358 does not write the empty-ink information to the storage section 356a in step S250.

According to the present embodiment, when the processing section 358 determines that the ink remaining amount Qr is less than the threshold Pr in step S230a, since the ink remains in the ink cartridge 300 in an amount less than the threshold Pr, there is a high probability that the empty-ink information received from the printing apparatus 200 has been transmitted normally by the printing apparatus 200. On the other hand, when the processing section 358 determines that the ink remaining amount Qr is equal to or more than the threshold Pr in step S230a, since the ink remains in the ink cartridge 300 in an amount equal to or more than the threshold Pr, there is a high probability that the empty-ink information received from the printing apparatus 200 has been erroneously transmitted by the printing apparatus 200. Thus, the ink remaining amount Qr indicated by the ink amount information Ii is compared with the threshold Pr indicated by the threshold information It before the memory 352 writes the empty-ink information, and when the result thereof satisfies the writing condition described above, the memory 352 writes the empty-ink information to the storage section 356a. When the result does not satisfy the writing condition, the memory 352 does not write the empty-ink information to the storage section 356a. As a result, the memory 352 suppresses the empty-ink information from being written undesirably to the memory 352 due to a firmware failure, an empty-ink sensor failure, or the like of the printing apparatus 200. When the memory 352 determines that the ink remaining amount Qr is equal to or more than the threshold Pr, writing of the empty-ink information is restricted, thereby suppressing the ink cartridge 300 from being unusable due to erroneous recording of the empty-ink information.

3. Third Embodiment

Figure 10:
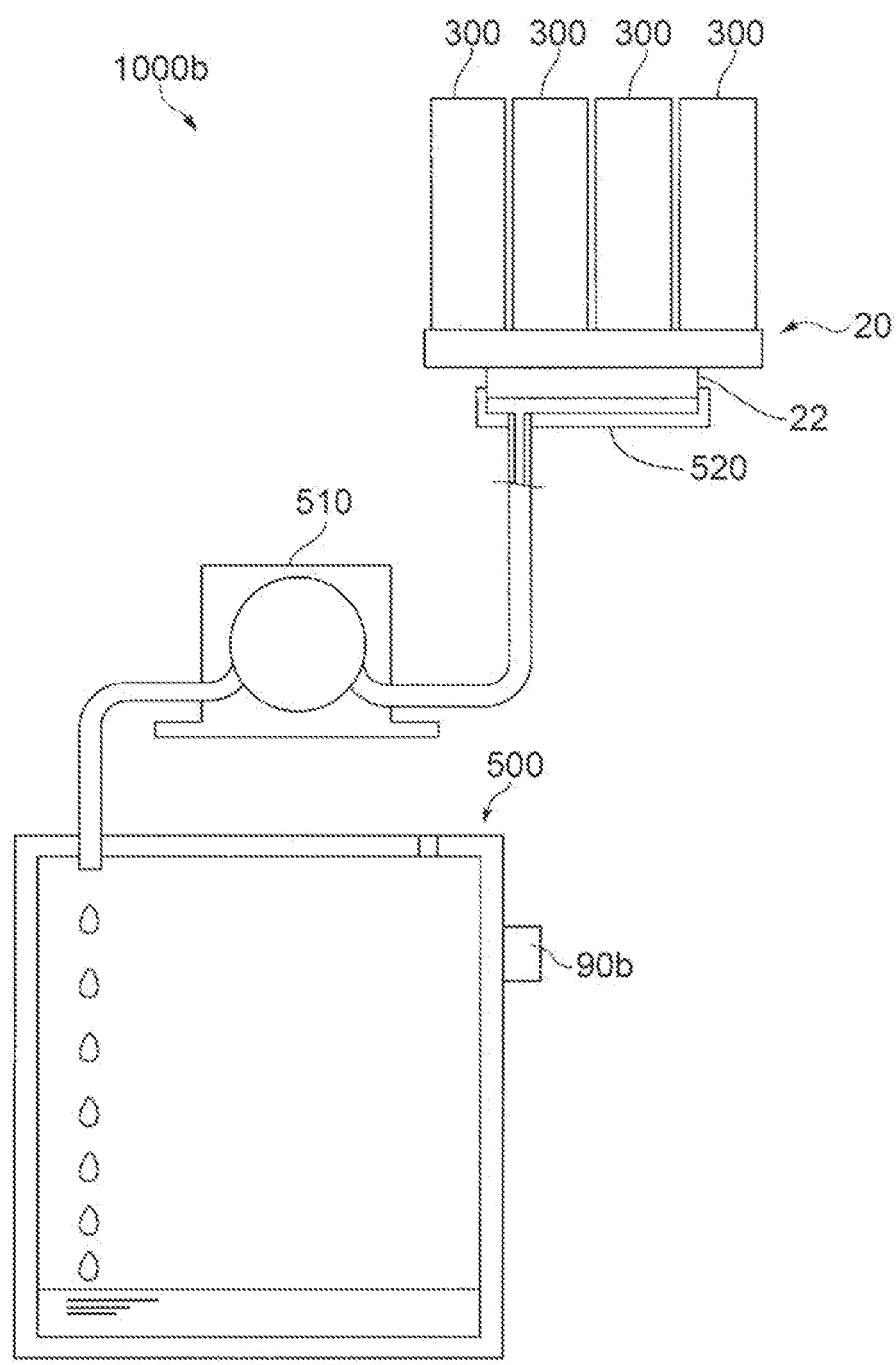
FIG. 10 illustrates a portion of a printing system in a third embodiment.

FIG. 10 illustrates a portion of a printing system 1000b in a third embodiment. The printing system 1000b in the third embodiment includes a waste-ink tank 500 as a liquid storage container, a sucking pump 510, and a capping mechanism 520 in addition to those included in the printing system 1000 illustrated in FIGS. 1 and 2. Waste ink discharged during maintenance of the printing head 22 is collected in the waste-ink tank 500. During maintenance of the printing head 22, the capping mechanism 520 is attached to a nozzle surface of the printing head 22, and the sucking pump 510 generates a negative pressure in the capping mechanism 520. The sucked waste ink is collected in the waste-ink tank 500 via a tube.

The waste-ink tank 500 includes a detecting element 90b. The detecting element 90b detects the amount of the waste ink in the waste-ink tank 500 and may be a temperature sensor, an electrode sensor, a sensor for sensing a liquid surface, or the like in addition to a detecting element including a light-emitting element and a light-receiving element, for example, as illustrated in FIG. 1.

The memory 352 in the third embodiment includes a storage section 356b instead of the storage section 356 in the first embodiment.

Figure 11:
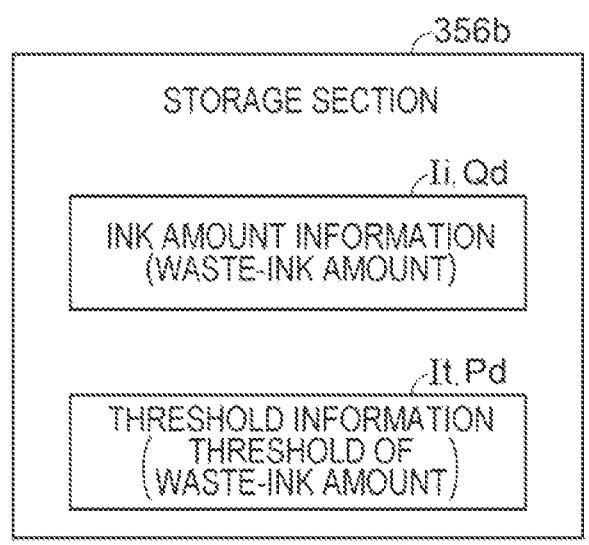
FIG. 11 is a block diagram illustrating information stored in a storage section in the third embodiment.

FIG. 11 is a block diagram illustrating information stored in the storage section 356b. Ink amount information Ii and threshold information It are stored in the storage section 356b. In the present embodiment, the ink amount information Ii is information indicating a waste-ink amount Qd, which is the cumulative amount of the waste ink discharged from the printing apparatus 200 and collected in the waste-ink tank 500. Each time the printing apparatus 200 performs maintenance or the like, the processing section 358 receives, from the printing apparatus 200, information about the amount of the waste ink discharged from the printing apparatus 200 and updates the ink amount information Ii.

In the present embodiment, the threshold information It is information indicating a threshold Pd of the waste-ink amount Qd. Regarding the threshold information It, the threshold Pd is factory set as an initial value, and the processing section 358 uses the threshold information It to perform comparing processing Sc described later. Both the waste-ink amount Qd and the threshold Pd are expressed as a percentage (%), and 100% represents a state in which the waste-ink amount Qd is the same as the amount of the waste ink able to be stored in the waste-ink tank 500. The threshold information It is set to, for example, 90%. Note that the waste-ink amount Qd and the threshold Pd may be expressed in units of mass (g).

Various kinds of information are also stored in the storage section 356b in addition to the ink amount information Ii and the threshold information It. Full-ink information described later is also stored in the storage section 356b.

Figure 12A:
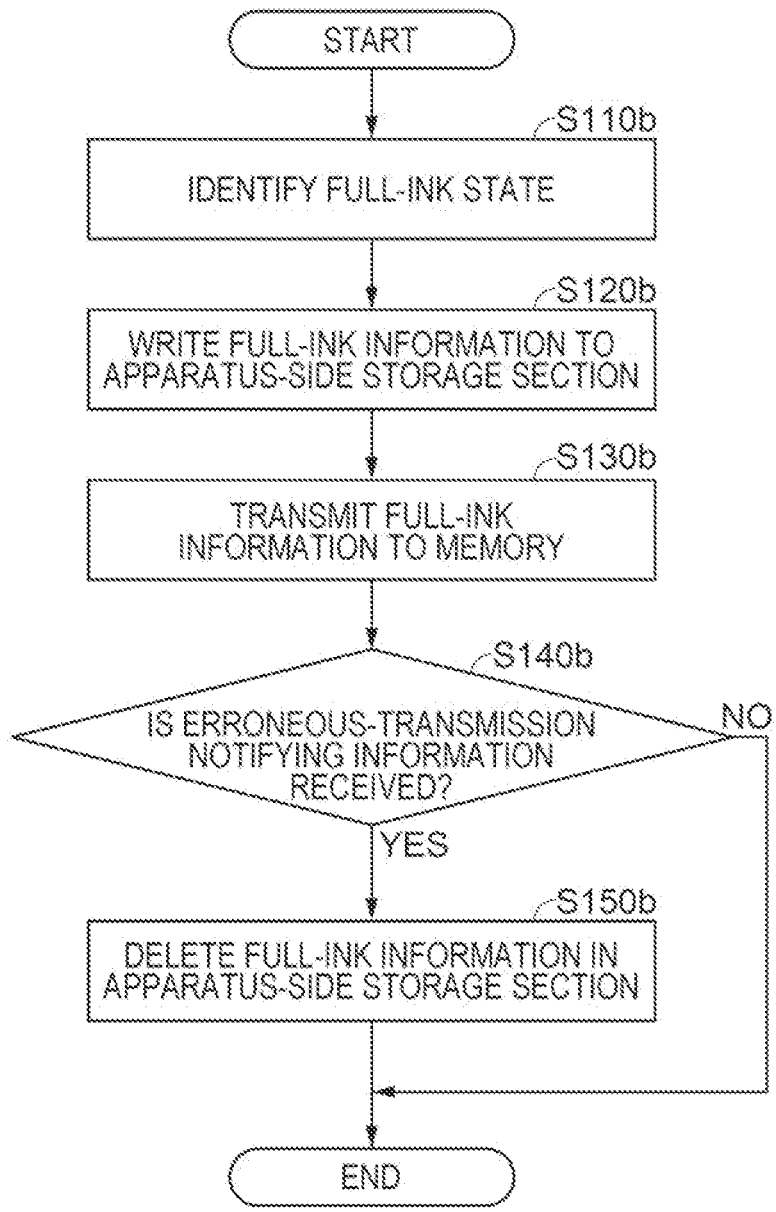
FIG. 12A is a flowchart of processing of a printing apparatus in the third embodiment.
Figure 12B:
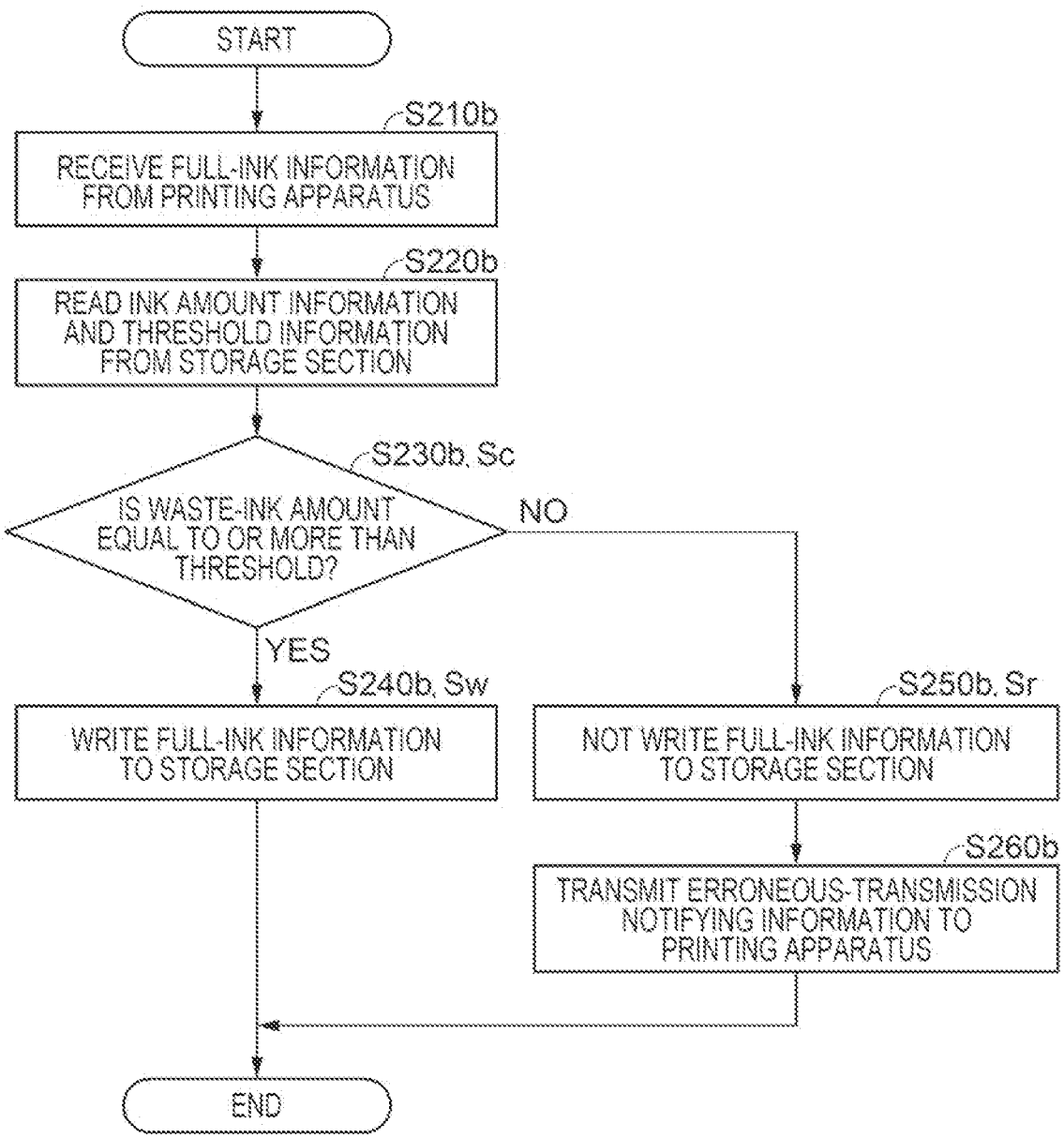
FIG. 12B is a flowchart of processing of memory in the third embodiment.

FIG. 12A is a flowchart of processing of the printing apparatus 200 in the third embodiment. FIG. 12B is a flowchart of processing of the memory 352 in the third embodiment. A flowchart of the entire processing of the printing system 1000b is constituted by the flowcharts of FIGS. 12A and 12B.

First, the processing of the printing apparatus 200 will be described with reference to FIG. 12A. In step S110b, the main control section 120 identifies that the waste-ink tank 500 is in a full-ink state. The full-ink state refers to a state in which the waste-ink tank 500 is full of waste ink such that the printing apparatus 200 is not able to perform maintenance and the waste-ink tank 500 is unusable. The full-ink state is detected by the detecting element 90b of the printing apparatus 200, for example, as illustrated in FIG. 10. In the present embodiment, step S110b includes not only an instance in which the detecting element 90b actually detects the full-ink state but also an instance in which the main control section 120 identifies the full-ink state due to a firmware failure of the printing apparatus 200 or due to erroneous operation of the detecting element 90b.

In step S120b, the main control section 120 writes, to the apparatus-side storage section 190, full-ink information as detection information indicating that the waste-ink tank 500 is in the full-ink state. For example, the main control section 120 sets a full-ink flag in the apparatus-side storage section 190.

In step S130b, the communication processing section 110 transmits the full-ink information to the memory 352 via the bus 400.

Note that step S120b and step S130b may be performed at the same time, or step S120b may be performed after step S130b is performed.

Next, the processing of the memory 352 after step S130b in FIG. 12A will be described with reference to FIG. 12B. In step S210b, the processing section 358 receives the full-ink information from the printing apparatus 200. In step S220b, the processing section 358 reads the ink amount information Ii and the threshold information It from the storage section 356b. In step S230b, the processing section 358 performs processing of comparing the ink amount information Ii with the threshold information It. Specifically, the processing section 358 performs processing of comparing the waste-ink amount Qd indicated by the ink amount information Ii with the threshold Pd indicated by the threshold information It. The processing performed in step S230b is also referred to as comparing processing Sc similarly to that in step S230 in the first embodiment.

In step S230b, the processing section 358 determines whether or not the result of the comparing processing Sc satisfies a predetermined writing condition. The writing condition in the present embodiment is a condition in which the waste-ink amount Qd is equal to or more than the threshold Pd. When determining that the waste-ink amount Qd is equal to or more than the threshold Pd, the processing section 358 writes the full-ink information to the storage section 356b in step S240b. The processing performed in step S240b is also referred to as writing processing Sw similarly to that in step S240 in the first embodiment. On the other hand, when determining that the waste-ink amount Qd is less than the threshold Pd in step S230b, the processing section 358 does not write the full-ink information to the storage section 356b in step S250b. The processing performed in step S250b is also referred to as writing restriction processing Sr similarly to that in step S250 in the first embodiment.

When step S250b is performed, the processing section 358 in step S260b transmits, to the printing apparatus 200, erroneous-transmission notifying information for notifying that the full-ink information has been erroneously transmitted by the printing apparatus 200.

Next, the processing of the printing apparatus 200 after step S240b and step S260b in FIG. 12B will be described with reference to FIG. 12A. In step S140b, the communication processing section 110 determines whether or not the erroneous-transmission notifying information is received from the memory 352. When the erroneous-transmission notifying information is received, the main control section 120 in step S150b deletes the full-ink information stored in the apparatus-side storage section 190. Specifically, the full-ink flag set in step S120b is cancelled. On the other hand, when the erroneous-transmission notifying information is not received, the main control section 120 ends the processing.

According to the present embodiment, when the processing section 358 determines that the waste-ink amount Qd is equal to or more than the threshold Pd in step S230b, since waste ink is collected in the waste-ink tank 500 in an amount equal to or more than the threshold Pd, there is a high probability that the full-ink information received from the printing apparatus 200 has been transmitted normally by the printing apparatus 200. On the other hand, when the processing section 358 determines that the waste-ink amount Qd is less than the threshold Pd in step S230b, since the waste-ink amount Qd does not reach the threshold Pd, waste ink is insufficiently collected in the waste-ink tank 500, and there is a high probability that the full-ink information received from the printing apparatus 200 has been erroneously transmitted by the printing apparatus 200. Thus, the waste-ink amount Qd indicated by the ink amount information Ii is compared with the threshold Pd indicated by the threshold information It before the memory 352 writes the full-ink information, and when the result thereof satisfies the writing condition described above, the memory 352 writes the full-ink information to the storage section 356b. When the result does not satisfy the writing condition, the memory 352 does not write the full-ink information to the storage section 356b. As a result, the memory 352 suppresses the full-ink information from being written undesirably to the memory 352 due to a firmware failure, a full-ink sensor failure, or the like of the printing apparatus 200. When the memory 352 determines that the waste-ink amount Qd is less than the threshold Pd, writing of the full-ink information is restricted, thereby suppressing the waste-ink tank 500 from being unusable due to erroneous recording of the full-ink information.

4. First Modified Example

Figure 13A:
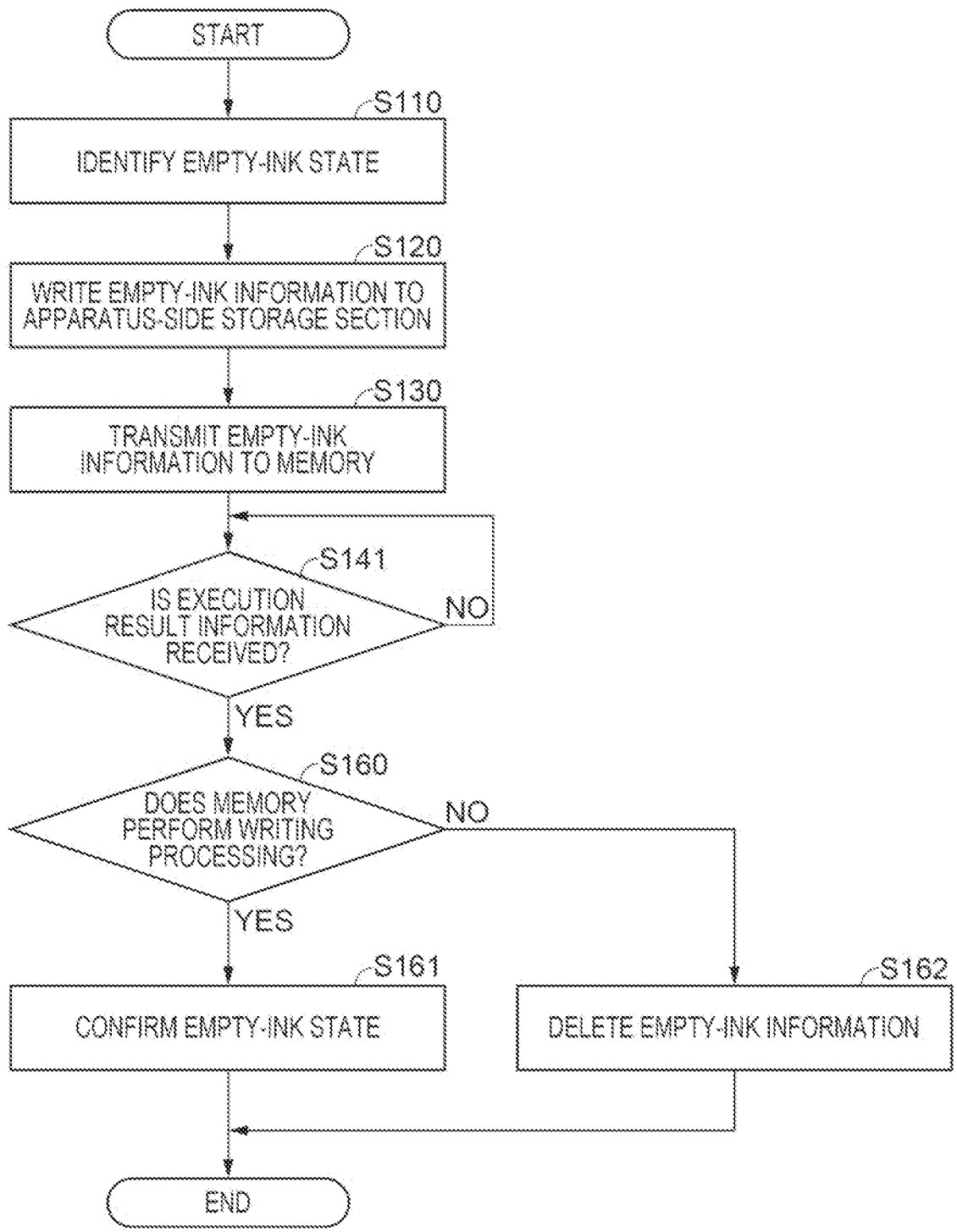
FIG. 13A is a flowchart of processing of a printing apparatus in a first modified example.
Figure 13B:
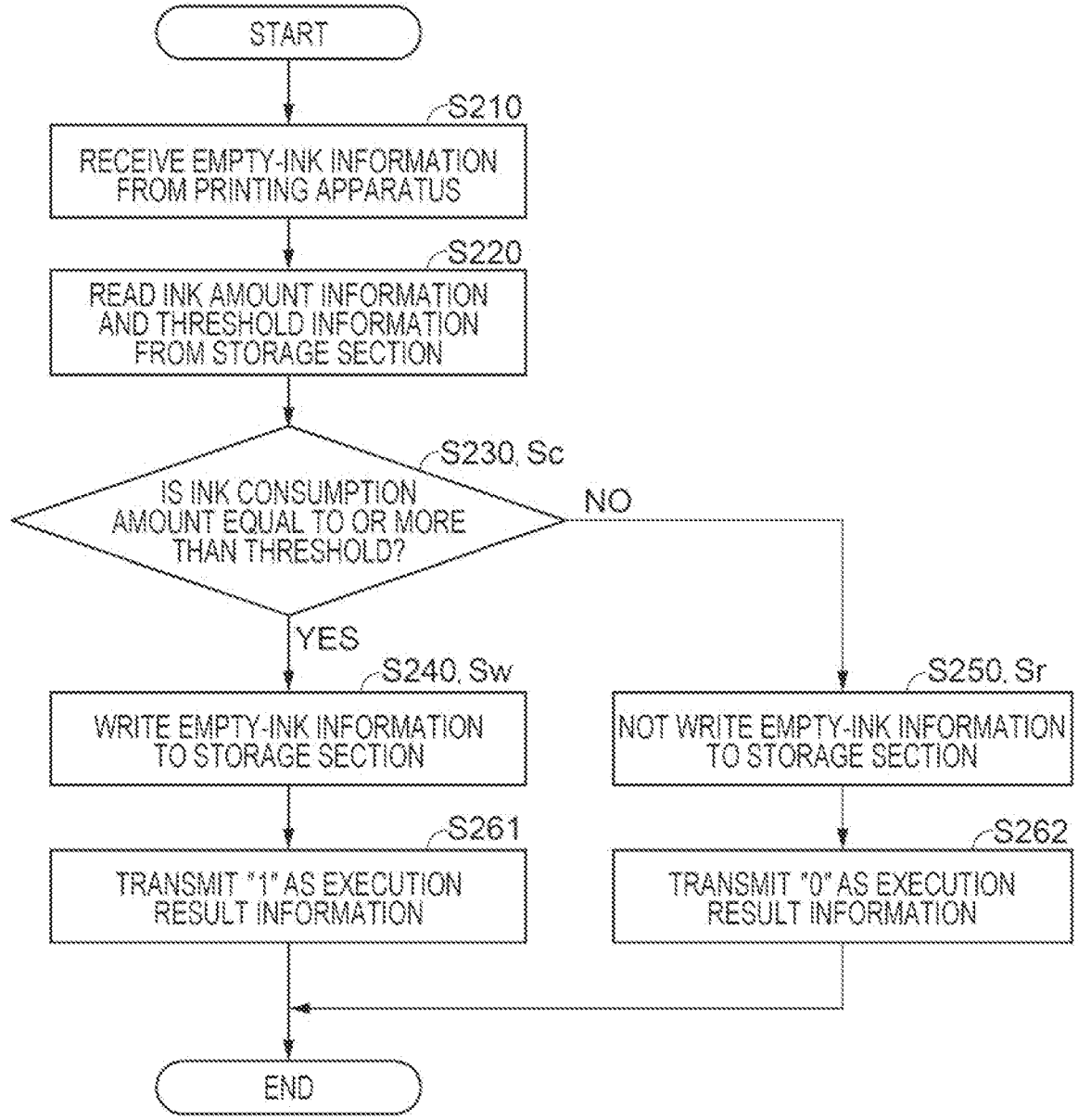
FIG. 13B is a flowchart of processing of memory in the first modified example.

FIG. 13A is a flowchart of processing of the printing apparatus 200 in a first modified example. FIG. 13B is a flowchart of processing of the memory 352 in the first modified example. A flowchart of the entire processing of the printing system 1000 in the first modified example is constituted by the flowcharts of FIGS. 13A and 13B. The same components as those of the first embodiment will be given the same numerals, and redundant description will be omitted.

In the first modified example, execution result information is transmitted to the printing apparatus 200 instead of the erroneous-transmission notifying information transmitted to the printing apparatus 200 in step S260 in the first embodiment. The execution result information is information indicating whether or not the empty-ink information has been written to the storage section 356.

Steps S110, S120, and S130 in FIG. 13A and steps S210, S220, and S230 in FIG. 13B are similar to those of the first embodiment. As illustrated in FIG. 13B, when the processing section 358 determines that the ink consumption amount Qc is equal to or more than the threshold Pc in step S230 and when the processing section 358 writes the empty-ink information to the storage section 356 in step S240, the processing section 358 in step S261 transmits, for example, "1" as the execution result information indicating that the empty-ink information has been written to the storage section 356. On the other hand, when the processing section 358 determines that the ink consumption amount Qc is less than the threshold Pc in step S230 and when the processing section 358 does not write the empty-ink information to the storage section 356 in step S250, the processing section 358 in step S262 transmits, for example, "0" as the execution result information indicating that the empty-ink information has not been written to the storage section 356.

As illustrated in FIG. 13A, when receiving the execution result information in step S141, the main control section 120 of the printing apparatus 200 in step S160 determines whether or not the processing section 358 of the memory 352 has written the empty-ink information to the storage section 356 in accordance with the execution result information received from the memory 352. When determining that the empty-ink information has been written to the storage section 356, the main control section 120 confirms the empty-ink state of the printing system 1000 in step S161. Specifically, without updating the empty-ink information stored in the apparatus-side storage section 190, the main control section 120 confirms that the ink cartridge 300 is unusable. On the other hand, when determining that the empty-ink information has not been written to the storage section 356 in step S160, the main control section 120 in step S162 deletes the empty-ink information stored in the apparatus-side storage section 190. Specifically, the main control section 120 cancels the empty-ink flag set in step S120.

According to the present modified example, although the printing apparatus 200 identifies that the ink cartridge 300 is in the unusable state when the empty-ink information is transmitted to the memory 352, it is possible to control the printing apparatus 200 more accurately by performing determination in accordance with the execution result information received from the memory 352. Moreover, when the memory 352 transmits the execution result information to the printing apparatus 200 to thereby notify the printing apparatus 200 of whether or not writing has been performed, the printing apparatus 200 is able to perform appropriate control by receiving information about the notification.

5. Second Modified Example

Figure 14A:
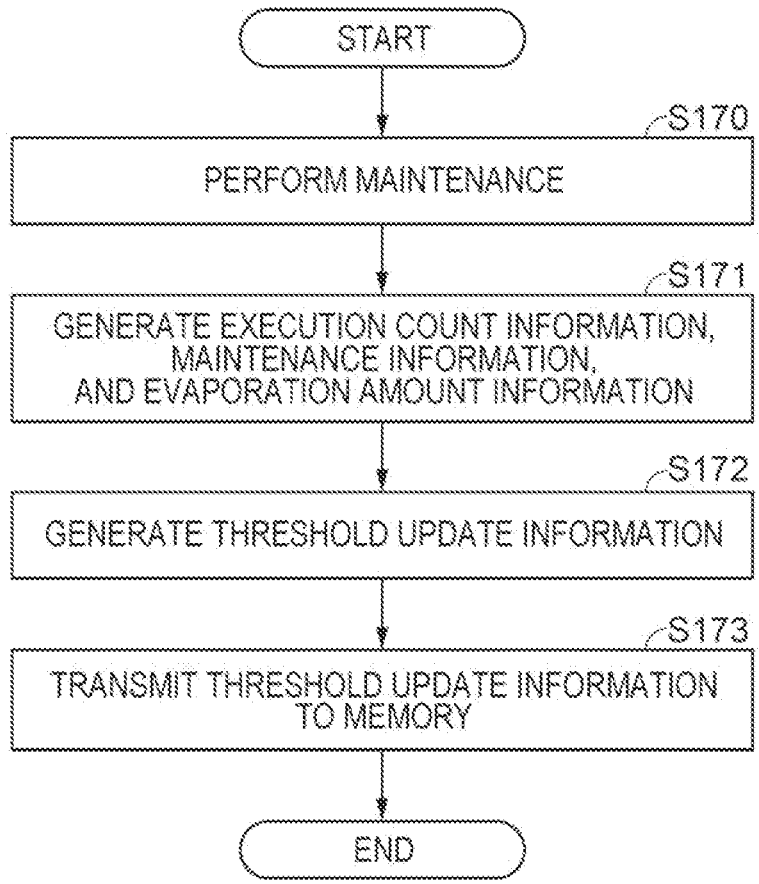
FIG. 14A is a flowchart of processing of a printing apparatus in a second modified example.
Figure 14B:
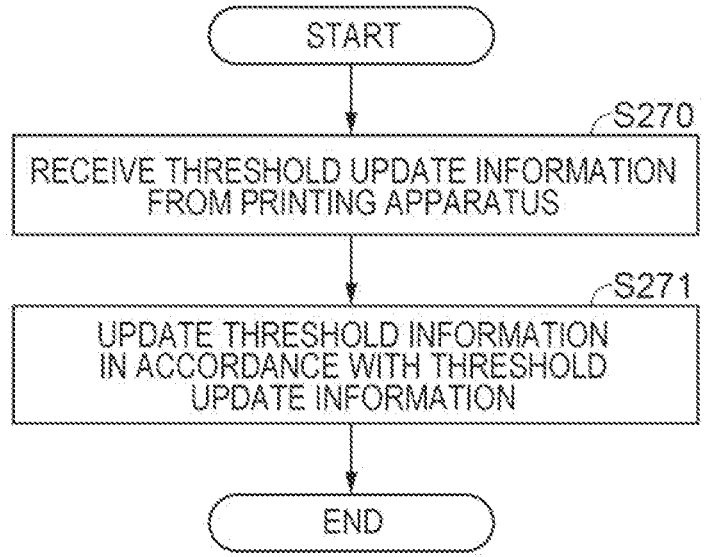
FIG. 14B is a flowchart of processing of memory in the second modified example.

FIG. 14A is a flowchart of processing of the printing apparatus 200 in a second modified example. FIG. 14B is a flowchart of processing of the memory 352 in the second modified example. A flowchart of the entire processing of the printing system 1000 in the second modified example is constituted by the flowcharts of FIGS. 14A and 14B. The same components as those of the first embodiment will be given the same numerals, and redundant description will be omitted.

In the second modified example, the printing apparatus 200 performs processing of updating the threshold information It stored in the storage section 356 of the memory 352 separately from the processing of the printing system 1000 indicated in the first embodiment. In the present modified example, processing when the printing apparatus 200 performs maintenance will be described.

As illustrated in FIG. 14A, the main control section 120 performs maintenance of the printing head 22 in step S170. The maintenance may be performed spontaneously by the main control section 120 or performed in accordance with a user instruction. In step S171, the main control section 120 generates execution count information, maintenance information, and evaporation amount information. The execution count information is information indicating the number of maintenance operations performed by the main control section 120. The execution count information is updated each time the main control section 120 performs maintenance. The maintenance information is information indicating the amount of ink consumed when the main control section 120 performs maintenance. The amount of ink consumed in accordance with a type of maintenance is stored in advance in the apparatus-side storage section 190. By reading the amount of ink according to a type of maintenance that is performed from the apparatus-side storage section 190, the main control section 120 generates the maintenance information. The evaporation amount information is information indicating the evaporation amount of ink evaporated from the ink cartridge 300. The evaporation amount is calculated in accordance with destination-country specific data, temperature data, season data, temporal data, and the like, which are stored in the apparatus-side storage section 190 and are not illustrated.

In step S172, the main control section 120 generates threshold update information in accordance with the execution count information, the maintenance information, and the evaporation amount information. For example, in an instance in which the number of maintenance operations exceeds a predetermined number, an instance in which maintenance that consumes a large amount of ink is performed, an instance in which the cumulative amount of ink consumed by performing maintenance exceeds a predetermined amount, or an instance in which the evaporation amount exceeds a predetermined value, or in a predetermined situation as a combination of the aforementioned instances, the main control section 120 generates the threshold update information. The threshold update information may be a new threshold or a difference from the current threshold. In step S173, the communication processing section 110 transmits the threshold update information to the memory 352.

As illustrated in FIG. 14B, the processing section 358 receives the threshold update information from the printing apparatus 200 in step S270. In step S271, the processing section 358 updates the threshold information It stored in the storage section 356 in accordance with the received threshold update information. When the threshold update information is information indicating a new threshold, the processing section 358 rewrites the threshold information It to information indicated by the threshold update information. When the threshold update information is a difference from the threshold Pc indicated by the threshold information It that has not been updated, the processing section 358 calculates a new threshold and updates the threshold information It.

When performing the processing of the first embodiment after the processing in FIGS. 14A and 14B ends, the printing system 1000 performs the processing in accordance with the threshold information It updated in step S271.

According to the present modified example, to prevent blank printing, the amount of ink according to a type of maintenance, which is stored in the apparatus-side storage section 190 of the printing apparatus 200, is estimated to be slightly larger than the amount of ink actually consumed by performing maintenance. When the number of maintenance operations increases, a difference between the amount of ink actually consumed by performing maintenance and the ink consumption amount written to the ink cartridge 300 becomes large. Thus, when the printing apparatus 200 transmits the threshold update information to the memory 352 and when the memory 352 updates the threshold information It, it is possible to accurately write the empty-ink information in accordance with the actual amount of ink.

Note that, although an example of the processing when maintenance is performed has been described in the present modified example, similar processing may be performed when printing is performed.

6. Third Modified Example

Figure 15A:
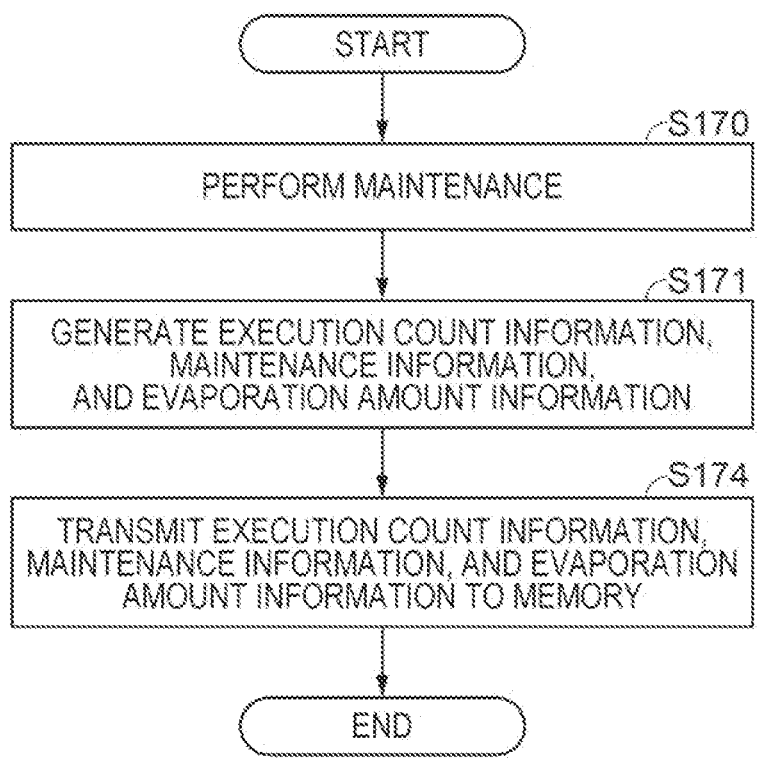
FIG. 15A is a flowchart of processing of a printing apparatus in a third modified example.
Figure 15B:
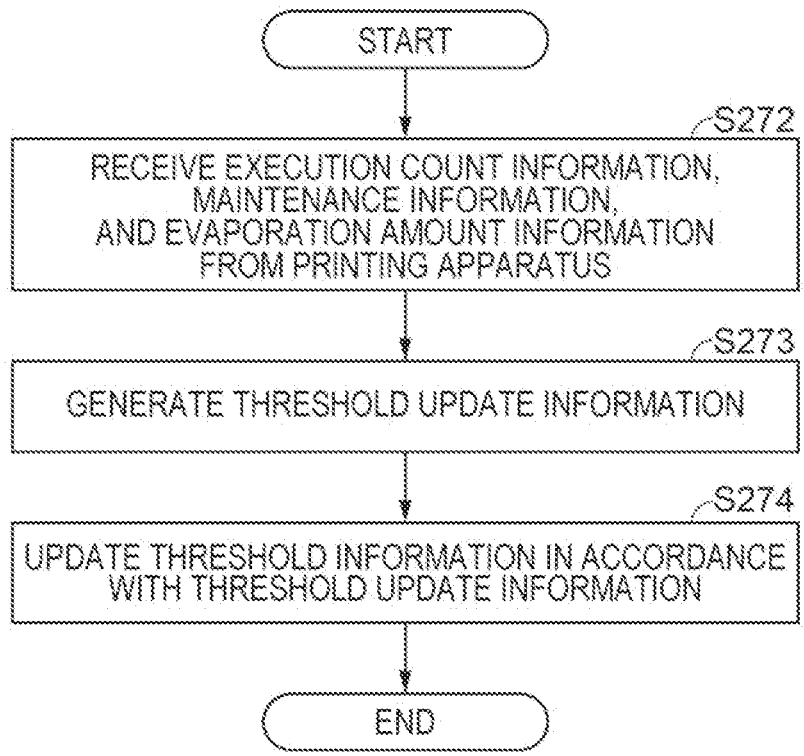
FIG. 15B is a flowchart of processing of memory in the third modified example.

FIG. 15A is a flowchart of processing of the printing apparatus 200 in a third modified example. FIG. 15B is a flowchart of processing of the memory 352 in the third modified example. A flowchart of the entire processing of the printing system 1000 in the third modified example is constituted by the flowcharts of FIGS. 15A and 15B. The same components as those of the second modified example will be given the same numerals, and redundant description will be omitted.

The present modified example differs from the second modified example in that the step of generating the threshold update information, which is performed by the printing apparatus 200, in the second modified example is performed by the memory 352. The printing apparatus 200 generates the execution count information, the maintenance information, and the evaporation amount information in step S171 and then transmits the pieces of information to the memory 352 in step S174.

In step S272, the processing section 358 receives the execution count information, the maintenance information, and the evaporation amount information from the printing apparatus 200. In step S273, the processing section 358 generates threshold update information in accordance with the execution count information, the maintenance information, and the evaporation amount information similarly to the operation performed by the main control section 120 in step S172 in the second modified example. In step S274, the processing section 358 updates the threshold information It stored in the storage section 356 in accordance with the generated threshold update information.

According to the third modified example, the memory 352 itself that has received various kinds of information about maintenance is able to update a threshold. It is also possible to accurately write the empty-ink information in accordance with the actual amount of ink.

7. Fourth Modified Example

Figure 16:
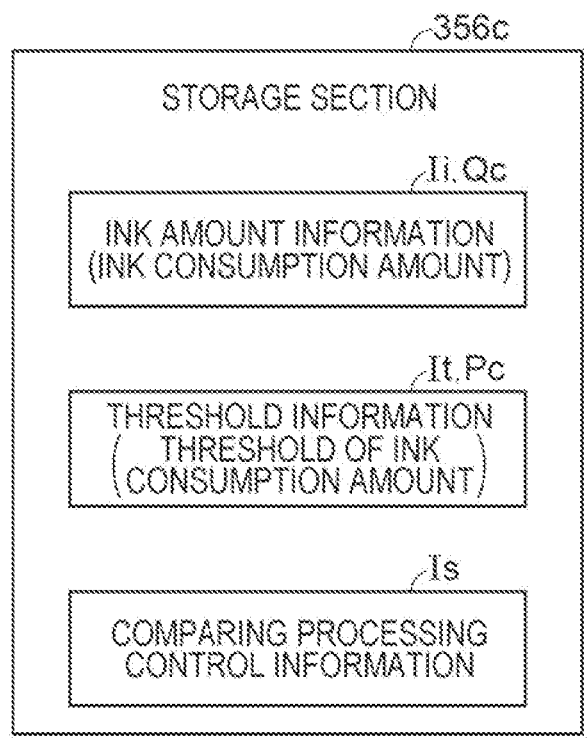
FIG. 16 is a block diagram illustrating information stored in a storage section in a fourth modified example.

FIG. 16 is a block diagram illustrating information stored in a storage section 356c in a fourth modified example. The same components as those of the first embodiment will be given the same numerals, and redundant description will be omitted. The storage section 356c in the fourth embodiment differs from that in the first embodiment in terms of storing comparing processing control information Is. The comparing processing control information Is is information indicating whether or not the processing section 358 is to perform comparing processing Sc in step S230 in FIG. 17 described later. The comparing processing control information Is includes valid comparing processing information or invalid comparing processing information. The valid comparing processing information is information indicating that the processing section 358 is to perform the comparing processing. The invalid comparing processing information is information indicating that the processing section 358 is not to perform the comparing processing Sc. For example, the storage section 356c stores "1" as the valid comparing processing information and "0" as the invalid comparing processing information.

Any of the valid comparing processing information and the invalid comparing processing information is factory set as the comparing processing control information Is. Moreover, the main control section 120 of the printing apparatus 200 transmits any of the valid comparing processing information and the invalid comparing processing information to the memory 352 as the comparing processing control information Is. When the processing section 358 of the memory 352 receives the comparing processing control information Is from the printing apparatus 200, the processing section 358 updates the comparing processing control information Is stored in the storage section 356c to the received comparing processing control information Is.

Figure 17:
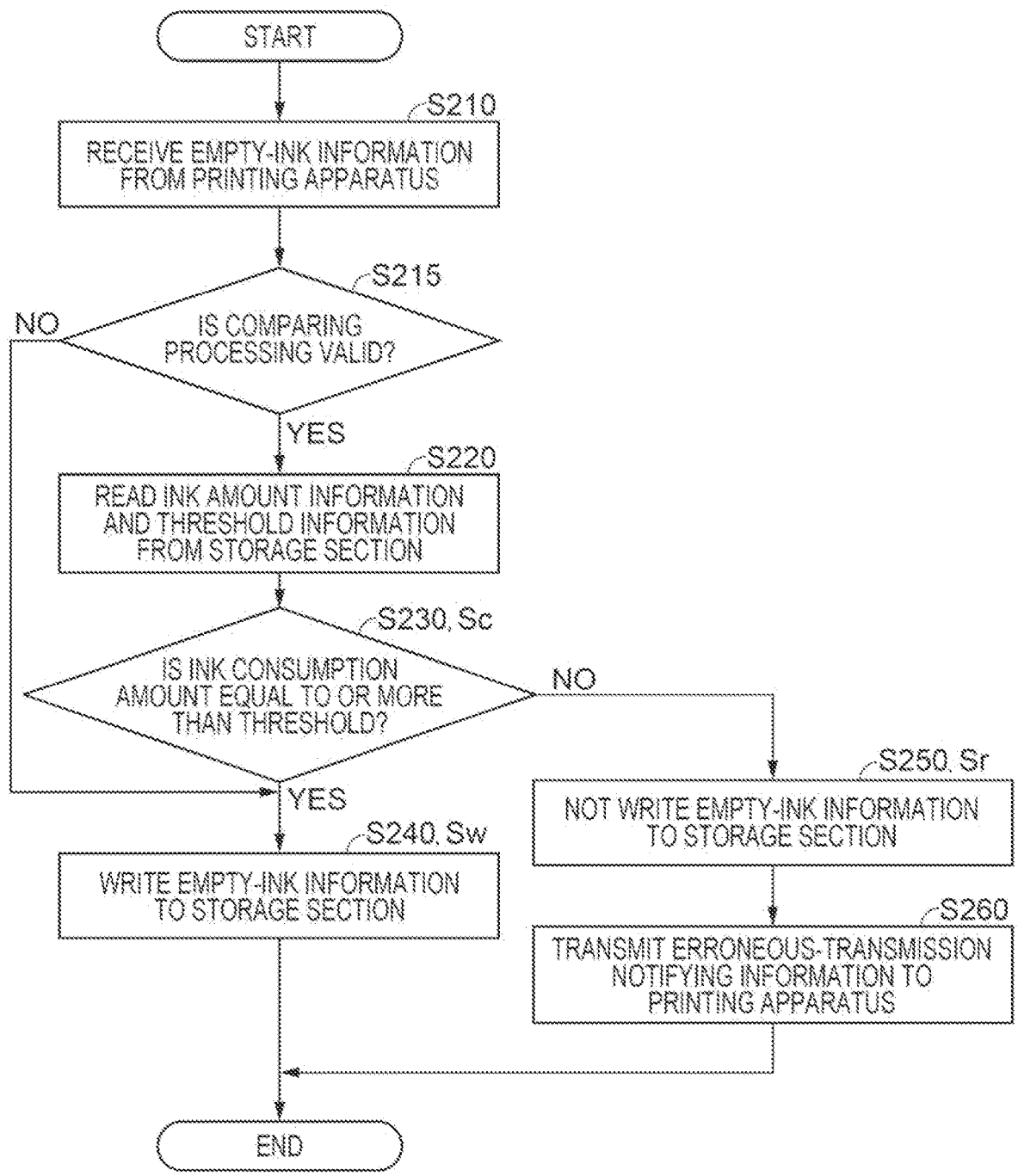
FIG. 17 is a flowchart of processing of memory in the fourth modified example.

FIG. 17 is a flowchart of processing of the memory 352 in the fourth modified example. The processing of the memory 352 in the fourth modified example differs from that in the first embodiment in that step S215 is performed between step S210 and step S220. When receiving the empty-ink information from the printing apparatus 200 in step S210, the processing section 358 determines whether the comparing processing Sc is valid or invalid in step S215. Specifically, the processing section 358 checks whether the comparing processing control information Is stored in the storage section 356c is the valid comparing processing information or the invalid comparing processing information. When the processing section 358 determines that the comparing processing Sc is valid, the processing of step S220 is performed. That is, the comparing processing Sc is performed. When the processing section 358 determines that the comparing processing Sc is invalid, the processing of step S240 is performed. That is, the comparing processing Sc is not performed.

According to the fourth modified example, the memory 352 controls whether or not to perform the comparing processing Sc in accordance with the comparing processing control information Is received from the printing apparatus 200, and it is thus possible to omit the comparing processing Sc when such processing is not required in accordance with an individual specification of the ink cartridge 300.

Note that the third modified example is able to achieve a function similar to that in the present modified example by using the threshold update information. Specifically, by setting the threshold update information such that the threshold Pc is updated to 0% as a percentage, it is possible to perform adjustment such that the empty-ink information is not written at all times in step S230 in FIG. 7B.

8. Fifth Modified Example

In the first embodiment, each time the printing apparatus 200 consumes ink, the processing section 358 of the memory 352 receives an individual consumption amount, which corresponds to the amount of ink newly consumed, from the printing apparatus 200 and updates the ink amount information Ii of the storage section 356. In the present modified example, when updating the ink amount information Ii, the processing section 358 compares the received individual consumption amount with a threshold and determines whether or not to update the ink amount information Ii in accordance with the comparison result. The threshold is changed in accordance with an operation state of the printing apparatus 200 when ink is consumed. Note that, similarly to the first embodiment, the ink amount information Ii indicates the ink consumption amount Qc, which is the cumulative amount of ink consumed by the printing apparatus 200, and the processing section 358 adds the received individual consumption amount to the ink consumption amount Qc to thereby update the ink amount information Ii.

Figure 18:
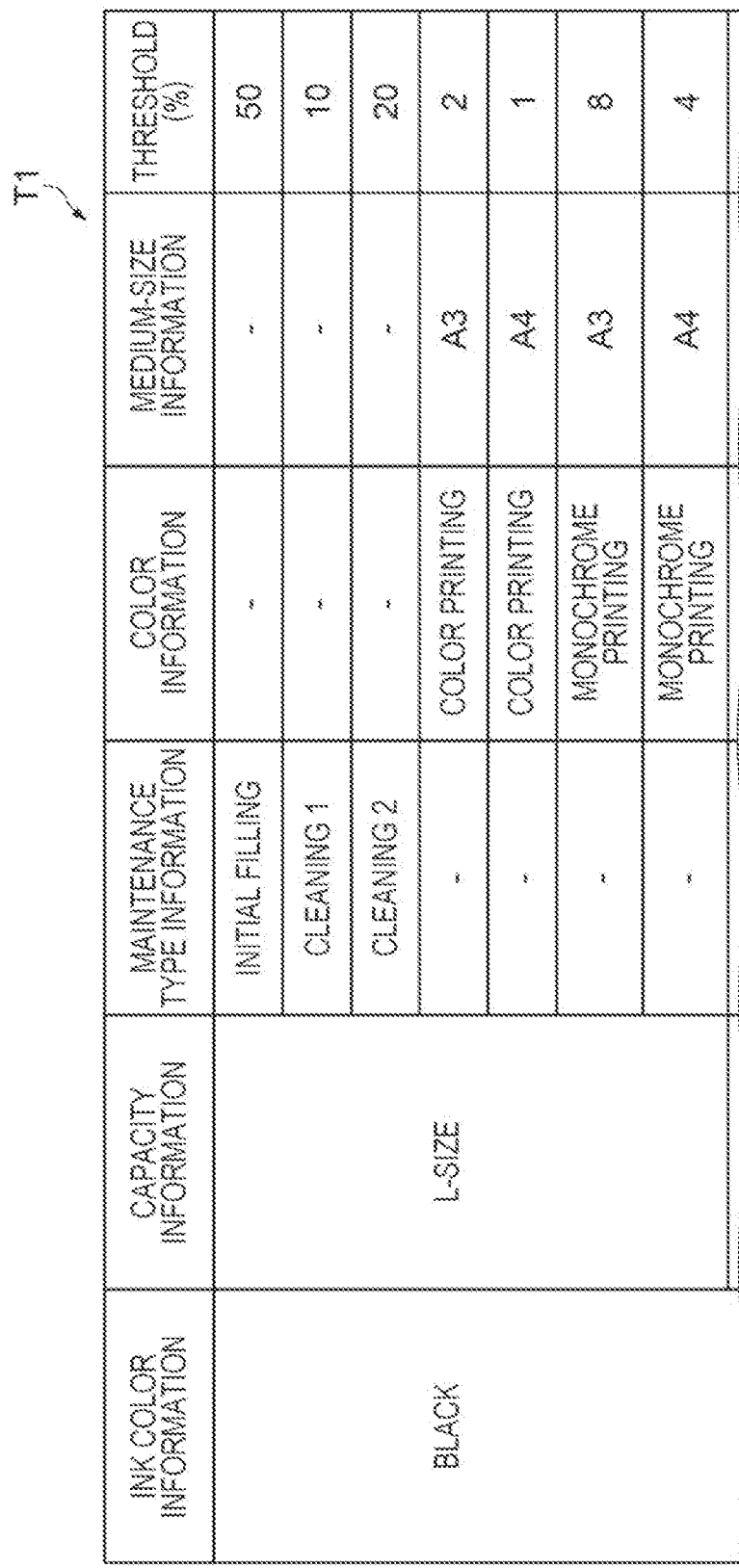
FIG. 18 illustrates a table in which an operation state of a printing apparatus is associated with a threshold in a fifth modified example.

For example, as illustrated in FIG. 18, table T1 in which an operation state of the printing apparatus 200 is associated with a threshold is stored in the storage section 356 of the memory 352. Table T1 includes, as operation information indicating an operation state of the printing apparatus 200, ink color information indicating a color of consumed ink, capacity information indicating a size of the attached ink cartridge 300, maintenance type information about a type of maintenance, color information indicating whether printing is color printing or monochrome printing, and medium-size information indicating a size of the printing medium PM, and the threshold is defined in accordance with a combination of the pieces of information. Note that, in FIG. 18, only black is indicated for the ink color information, and only an L-size is indicated for the capacity information, but thresholds regarding another color and another size are similarly defined. The individual consumption amount and the threshold are expressed as a percentage (%) in which 100% represents a state in which the individual consumption amount is the same as the storage amount of the ink storage section 305, and the threshold is set to a value larger than the individual consumption amount that is assumed in the corresponding operation state. Note that the individual consumption amount and the threshold may be expressed in units of mass (g). The maintenance type information is operation information used when the printing apparatus 200 performs maintenance such as initial filling or cleaning, and the color information and the medium-size information are operation information used when the printing apparatus 200 performs printing. When maintenance is performed, a larger amount of ink is consumed compared with an instance in which printing is performed, and a large value is thus set to the threshold. In particular, when initial filling is performed, a large amount of ink is consumed, and a largest threshold is thus set. When two types of cleaning that differ in intensity are performed, a threshold according to the intensity is set. When printing is performed, a threshold according to a size of the printing medium PM is set. Regarding black ink, a large amount of ink is consumed in monochrome printing compared with color printing, and a larger threshold is set for monochrome printing compared with color printing.

When performing an operation, such as printing or maintenance, in which ink is consumed, the printing apparatus 200 issues an instruction of updating the ink amount information Ii to the memory 352 and transmits the individual consumption amount that is consumed and the aforementioned operation information to the memory 352. The processing section 358 obtains the individual consumption amount and the operation information, which are transmitted, determines a threshold according to the operation state in accordance with the operation information that is obtained and table T1, and compares the obtained individual consumption amount with the threshold. When the obtained individual consumption amount is equal to or more than the threshold as a result of comparison, it is determined that a failure has occurred in the printing apparatus 200, and the ink amount information Ii is not updated. Only when the obtained individual consumption amount is less than the threshold, the ink amount information Ii is updated.

Figure 19:
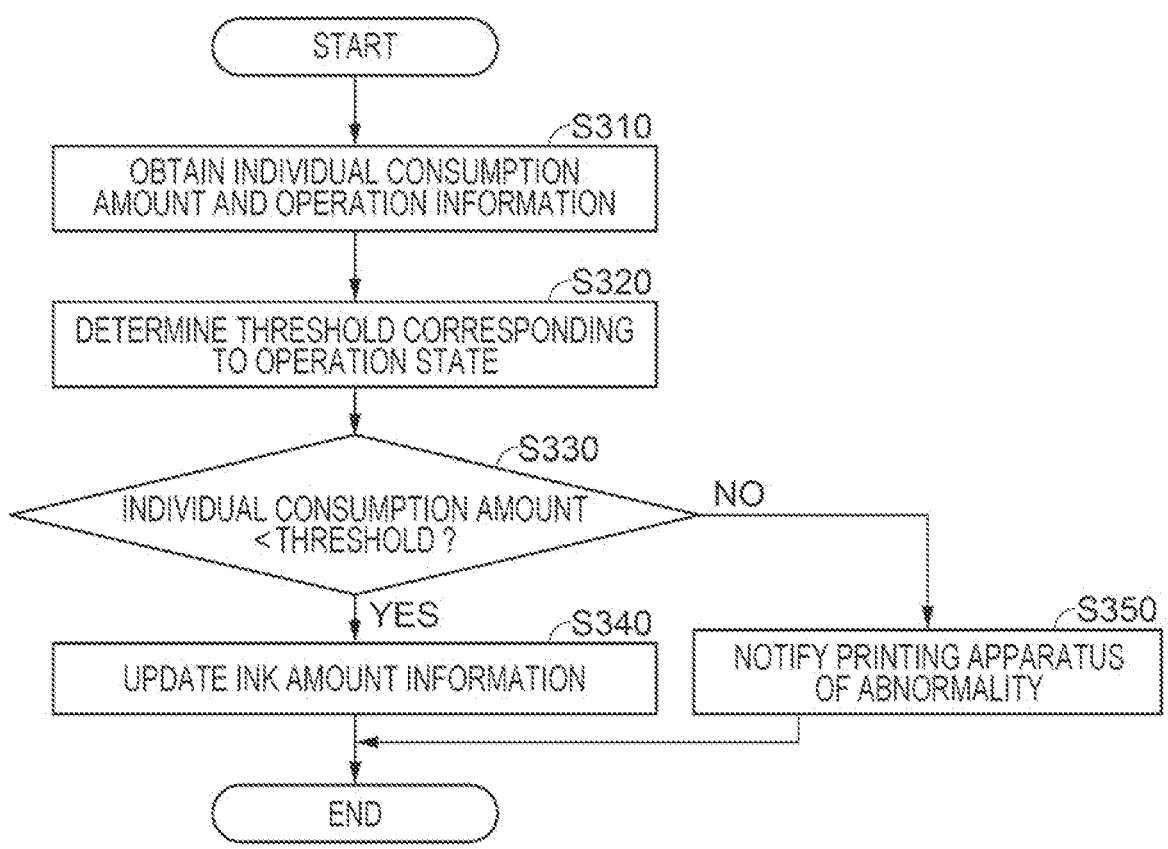
FIG. 19 is a flowchart of processing of memory in the fifth modified example.

FIG. 19 is a flowchart of processing of the memory 352 when an instruction of updating the ink amount information Ii is received. Upon receiving an instruction of updating the ink amount information Ii from the printing apparatus 200, the processing section 358 of the memory 352 operates in accordance with the flowchart of FIG. 19.

As illustrated in FIG. 19, in step S310, the processing section 358 obtains the individual consumption amount and the operation information, which are transmitted together with the updating instruction, from the printing apparatus 200.

In step S320, the processing section 358 determines a threshold corresponding to an operation state in accordance with the obtained operation information and table T1 stored in the storage section 356.

In step S330, the processing section 358 compares the obtained individual consumption amount with the threshold and determines whether or not the individual consumption amount is less than the threshold. When the individual consumption amount is less than the threshold, the procedure proceeds to the processing of step S340, and when the individual consumption amount is equal to or more than the threshold, the procedure proceeds to the processing of step S350.

When the obtained individual consumption amount is less than the threshold and when the procedure proceeds to the processing of step S340, the processing section 358 reads the ink amount information Ii stored in the storage section 356 at that time, adds the obtained individual consumption amount to the ink consumption amount Qc indicated by the ink amount information Ii, and updates the ink amount information Ii. The updated ink amount information Ii is stored in the storage section 356, and the processing ends.

On the other hand, when the obtained individual consumption amount is equal to or more than the threshold and when the procedure proceeds to the processing of step S350, the processing section 358 does not update the ink amount information Ii, notifies the printing apparatus 200 that the transmitted individual consumption amount has an abnormal value, and ends the processing. Upon being notified, the printing apparatus 200 performs an operation according to the notification. For example, the main control section 120 of the printing apparatus 200 performs a recovery sequence for exiting the abnormal state. Alternatively, the main control section 120 may notify a user by displaying a message indicating an occurrence of abnormality on the display section 210.

According to the foregoing configuration, the ink amount information Ii is suppressed from being updated in accordance with an erroneous individual consumption amount due to a failure of the printing apparatus 200.

Note that the aforementioned updating control performed by using the threshold, that is, control for determining whether or not to update the ink amount information Ii in accordance with the result of comparison between the individual consumption amount and the threshold, may be disabled. For example, when information indicating that updating control is disabled is received from the printing apparatus 200 together with an instruction of updating the ink amount information Ii, the processing section 358 may update the ink amount information Ii unconditionally without performing comparison with the threshold. Alternatively, the aspect may be such that updating control is performed only when maintenance is performed and such that updating control is disabled when printing is performed.

A timing at which the printing apparatus 200 issues an instruction of updating the ink amount information Ii may be before or after an operation in which ink is consumed. However, in an aspect in which the ink amount information Ii is updated after the operation, the ink amount information Ii is not updated when an abnormal situation, for example, in which power supply is stopped halfway in the operation occurs, the stored ink consumption amount Qc may be significantly smaller than the actual cumulative consumption amount. Thus, when maintenance that consumes a relatively large amount of ink is performed, the ink amount information Ii is desirably updated before the operation in accordance with the assumed individual consumption amount. On the other hand, when printing that consumes a relatively small amount of ink is performed, the ink amount information Ii may be updated after printing in accordance with the actual individual consumption amount.

The aspect is not limited to an aspect in which the processing section 358 of the memory 352 performs updating of the ink amount information Ii, that is, processing of adding the individual consumption amount to the ink consumption amount Qc, and may be an aspect in which the printing apparatus 200 obtains the ink amount information Ii from the memory 352 and updates the ink amount information Ii. In such an instance, the printing apparatus 200 transmits the updated ink amount information Ii to the memory 352 and causes the storage section 356 to store the ink amount information Ii.

Although the ink color information, the capacity information, the maintenance type information, the color information, and the medium-size information are exemplified as the operation information contributing to determination of a threshold in the present modified example, the operation information is not limited thereto. For example, information indicating environmental temperature and information indicating, for example, the number of days elapsed from when the ink cartridge 300 starts to be used may be included. Note that, when an appropriate threshold varies depending on the number of elapsed days, an environmental change, or the like, the configuration may be such that the threshold in Table T1 is able to be updated in accordance with such a change. In this instance, the printing apparatus 200 instructs the memory 352 to update the threshold in accordance with a user instruction or the detection result of detecting an environmental change or the like and transmits a new threshold to the memory 352. The processing section 358 of the memory 352 then updates the threshold in table T1 stored in the storage section 356 to the received threshold.

9. Other Embodiments

The first to fifth modified examples have been described with reference to the first embodiment but may be applied to the second and third embodiments.

Although the printing system 1000 in the first embodiment described above is a so-called on-carriage printing system in which the ink cartridge 300 is attached to the holder 21 of the printing apparatus 200, the printing system 1000 is not limited thereto. For example, the disclosure is applicable to a so-called off-carriage printing system in which an ink cartridge is attached to a portion different from a holder of a printing apparatus and in which ink is supplied to a printing head via a supplying tube.

The disclosure can also be realized in various forms other than the printing apparatus, the liquid storage container, and the memory. The disclosure can be realized in forms of, for example, a control method for the printing apparatus, for the liquid storage container, or for the memory, a computer program for realizing the control method, and a non-transitory recording medium recording the computer program.

All of the multiple components included in the respective forms of the disclosure described above are not necessarily required. To address some or all of the problems described above or achieve some or all of the effects described in the present specification, some of the multiple components can be appropriately changed, deleted, or replaced with other new components, and some of limited contents can be deleted. Further, to address some or all of the problems described above or to achieve some or all of the effects described in the present specification, it is possible to combine some or all of the technical features included in a form of the disclosure described above with some or all of the technical features included in another form of the disclosure described above and create an independent form of the disclosure.

What is claimed is:

1. Memory provided in a liquid storage container attached to a printing apparatus, the memory comprising:
   a storage section in which ink amount information about an amount of ink stored in the liquid storage container and threshold information about a threshold of the amount of the ink are stored; and
   a processing section that performs processing based on information received from the printing apparatus and information stored in the storage section, wherein
   when receiving, from the printing apparatus, detection information indicating that the liquid storage container is in an unusable state, the processing section performs comparing processing of comparing the ink amount information with the threshold information,
   when a result of the comparing processing satisfies a predetermined writing condition, the processing section writes the detection information to the storage section, and
   when the result of the comparing processing does not satisfy the writing condition, the processing section considers that the detection information is erroneous and consequently does not write the detection information to the storage section.

2. The memory according to claim 1, wherein
   the liquid storage container is an ink cartridge in which the ink to be supplied to the printing apparatus is stored,
   the ink amount information is information indicating an ink consumption amount, which is a cumulative amount of the ink supplied from the liquid storage container to the printing apparatus and consumed by the printing apparatus,
   the threshold information is information indicating a threshold of the ink consumption amount,
   the detection information is empty-ink information indicating that the liquid storage container is in an empty-ink state, and
   the writing condition is a condition in which the ink consumption amount is equal to or more than the threshold.

3. The memory according to claim 1, wherein
   the liquid storage container is an ink cartridge in which the ink to be supplied to the printing apparatus is stored,
   the ink amount information is information indicating an ink remaining amount, which is an amount of the ink remaining in the liquid storage container,
   the threshold information is information indicating a threshold of the ink remaining amount,
   the detection information is empty-ink information indicating that the liquid storage container is in an empty-ink state, and
   the writing condition is a condition in which the ink remaining amount is less than the threshold.

4. The memory according to claim 1, wherein
   the liquid storage container is a waste-ink tank in which waste ink discharged from the printing apparatus is collected,
   the ink amount information is information indicating a waste-ink amount, which is a cumulative amount of the waste ink,
   the threshold information is information indicating a threshold of the waste-ink amount,
   the detection information is full-ink information indicating that the liquid storage container is in a full-ink state, and
   the writing condition is a condition in which the waste-ink amount is equal to or more than the threshold.

5. The memory according to claim 1, wherein
when not writing the detection information to the storage section, the processing section transmits, to the printing apparatus, erroneous-transmission notifying information for notifying that the detection information was erroneously transmitted by the printing apparatus.

6. The memory according to claim 1, wherein
the processing section transmits, to the printing apparatus, execution result information indicating whether or not the detection information was written to the storage section.

7. The memory according to claim 1, wherein
the processing section updates the threshold information in accordance with threshold update information received from the printing apparatus.

8. A liquid storage container comprising the memory according to claim 1, the liquid storage container being attached to the printing apparatus.

9. A printing system comprising:
a printing apparatus; and
a liquid storage container attached to the printing apparatus and including memory, wherein
the memory includes
 a storage section in which ink amount information about an amount of ink stored in the liquid storage container and threshold information about a threshold of the amount of the ink are stored and
 a processing section that performs processing based on information received from the printing apparatus and information stored in the storage section,
the printing apparatus transmits, to the memory, detection information indicating that the liquid storage container is in an unusable state,
when receiving the detection information from the printing apparatus, the processing section performs comparing processing of comparing the ink amount information with the threshold information,
when a result of the comparing processing satisfies a predetermined writing condition, the processing section writes the detection information to the storage section, and
when the result of the comparing processing does not satisfy the writing condition, the processing section considers that the detection information is erroneous and consequently does not write the detection information to the storage section.

10. The printing system according to claim 9, wherein
the ink amount information is information indicating an ink consumption amount, which is a cumulative amount of the ink supplied from the liquid storage container to the printing apparatus and consumed by the printing apparatus,
the threshold information is information indicating a threshold of the ink consumption amount,
the detection information is empty-ink information indicating that the liquid storage container is in an empty-ink state, and
the writing condition is a condition in which the ink consumption amount is equal to or more than the threshold.

11. The printing system according to claim 9, wherein
when transmitting the detection information to the memory, the printing apparatus stores the detection information,
when not writing the detection information to the storage section, the processing section transmits, to the printing apparatus, erroneous-transmission notifying information for notifying that the detection information was erroneously transmitted by the printing apparatus, and
when receiving the erroneous-transmission notifying information from the memory, the printing apparatus deletes the detection information stored in the printing apparatus.

12. The printing system according to claim 9, wherein
when transmitting the detection information to the memory, the printing apparatus stores the detection information,
the memory transmits, to the printing apparatus, execution result information indicating whether or not the detection information was written to the storage section,
when receiving the execution result information and determining that the memory wrote the detection information to the storage section, the printing apparatus confirms that the liquid storage container is unusable, and
when receiving the execution result information and determining that the memory did not write the detection information to the storage section, the printing apparatus deletes the detection information stored in the printing apparatus.

13. The printing system according to claim 9, wherein
the printing apparatus transmits threshold update information for updating the threshold information stored in the storage section, and
when receiving the threshold update information, the processing section updates the threshold information to the threshold update information.

14. The printing system according to claim 9, wherein
the printing apparatus transmits, to the memory, comparing processing control information indicating whether or not the processing section is to perform the comparing processing,
the comparing processing control information includes valid comparing processing information indicating that the processing section is to perform the comparing processing or invalid comparing processing information indicating that the processing section is not to perform the comparing processing, and
when receiving the valid comparing processing information, the processing section performs the comparing processing upon receiving the detection information, and
when receiving the invalid comparing processing information, the processing section does not perform the comparing processing even upon receiving the detection information.

* * * * *